(12) United States Patent
Jiang et al.

(10) Patent No.: US 11,064,478 B2
(45) Date of Patent: Jul. 13, 2021

(54) METHOD AND DEVICE IN NODES WITH REDUCED SIGNALING OVERHEAD USED FOR WIRELESS COMMUNICATION

(71) Applicants: Qi Jiang, Shanghai (CN); KeYing Wu, Shanghai (CN); XiaoBo Zhang, Shanghai (CN)

(72) Inventors: Qi Jiang, Shanghai (CN); KeYing Wu, Shanghai (CN); XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 49 days.

(21) Appl. No.: 16/669,542

(22) Filed: Oct. 31, 2019

(65) Prior Publication Data

US 2020/0145966 A1    May 7, 2020

(30) Foreign Application Priority Data

Nov. 3, 2018    (CN) .......................... 201811303959.7

(51) Int. Cl.
*H04W 72/04* (2009.01)
*H04W 16/14* (2009.01)

(52) U.S. Cl.
CPC ......... *H04W 72/042* (2013.01); *H04W 16/14* (2013.01); *H04W 72/044* (2013.01)

(58) Field of Classification Search
CPC .......................... H04W 72/042; H04W 72/044
See application file for complete search history.

(56) References Cited

U.S. PATENT DOCUMENTS

| | | | | |
|---|---|---|---|---|
| 2005/0078707 A1* | 4/2005 | Maltsev | ................ | H04L 5/0053 370/471 |
| 2010/0166105 A1* | 7/2010 | Wu | ........................ | H04L 27/262 375/295 |
| 2010/0238978 A1* | 9/2010 | Lele | ......................... | H04J 13/10 375/146 |
| 2011/0274059 A1* | 11/2011 | Brown | .................. | H04L 5/0092 370/329 |
| 2013/0094490 A1* | 4/2013 | Taromaru | ............ | H04L 27/2637 370/343 |
| 2015/0257173 A1* | 9/2015 | You | ........................ | H04B 17/318 370/330 |
| 2016/0099822 A1* | 4/2016 | Thein | .................. | H04L 27/2659 375/260 |

(Continued)

*Primary Examiner* — Jael M Ulysse

(57) ABSTRACT

The present disclosure provides a method and a device in nodes for wireless communication. A first node receives a first signaling, and operates a first radio signal; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indication set(s), the K1 type indicating set(s) is(are) respectively used for indicating a type of multicarrier symbols comprised by the K1 first-type time unit(s). The present disclosure designs to create a connection between a first field and a second field, thus simplifying the indication of a slot format on unlicensed spectrum.

12 Claims, 15 Drawing Sheets

(56) References Cited

U.S. PATENT DOCUMENTS

| | | | |
|---|---|---|---|
| 2016/0128086 A1* | 5/2016 | Dinan | H04W 72/1226 |
| | | | 370/329 |
| 2016/0262133 A1* | 9/2016 | Yang | H04W 72/042 |
| 2016/0301555 A1* | 10/2016 | Nory | H04L 5/0053 |
| 2017/0135084 A1* | 5/2017 | Kuchibhotla | H04W 24/08 |
| 2017/0135116 A1* | 5/2017 | Kuchibhotla | H04L 43/087 |
| 2017/0163456 A1* | 6/2017 | Chen | H04L 27/264 |
| 2017/0163463 A1* | 6/2017 | Werner | H04L 27/2602 |
| 2017/0215188 A1* | 7/2017 | Kim | H04W 72/0446 |
| 2017/0223687 A1* | 8/2017 | Kuchibhotla | H04L 5/0094 |
| 2018/0367279 A1* | 12/2018 | Hellge | H04L 5/0048 |
| 2019/0268971 A1* | 8/2019 | Talarico | H04W 88/06 |

* cited by examiner

METHOD AND DEVICE IN NODES WITH REDUCED SIGNALING OVERHEAD USED FOR WIRELESS COMMUNICATION

CROSS-REFERENCE TO RELATED APPLICATION

This application claims the priority benefit of Chinese Patent Application Serial Number 201811303959.7, filed on Nov. 3, 2018, the full disclosure of which is incorporated herein by reference.

BACKGROUND

Technical Field

The present disclosure relates to transmission methods and devices in wireless communication systems, and in particular to a method and device of control signaling transmission.

Related Art

As future application scenarios of wireless communication systems become increasingly diversified, varying performance requirements have been posed on the systems. In order to meet such performance requirements of various application scenarios, a study item of access of unlicensed spectrum under New Radio (NR) has been approved at the 3rd Generation Partner Project (3GPP) Radio Access Network (RAN) #75 plenary session; at present, systems in Release 12, 13 and 14 are already able to support LBT-based wireless communication on unlicensed spectrum, and based on the latest version of standard base station, a base station is available for indicating Channel Occupation Time (COT) relevant information via an explicit signaling, thus helping the User Equipment in streamlining the LBT (Listen Before Talk) process and reducing time consumption to the benefit of faster uplink transmission.

Transmission methods of radio signals on unlicensed spectrum based on NR system is currently under evolution. Compared with LTE system, the NR system introduced Downlink Control Information (DCI) Format 2_0 in indicating a Slot Format Indicator (SFI), so as to realize flexible configuration of multicarrier symbols respectively used for transmitting uplink and transmitting downlink within a slot. When considering dynamic configuration of SFI, the design of COT in LAA needs to be revised and COT-related signaling needs to be redesigned.

SUMMARY

The inventors have found through researches that UCI includes Hybrid Automatic Repeat reQuest (HARQ)/Channel State Information (CSI). In order to support transmission with higher reliability and lower latency in NR Release 16, how to transmit UCI in a Physical Uplink Control CHannel (PUCCH) becomes a significant problem needed to be reconsidered.

In view of the above problem, the present disclosure provides a solution. It should be noted that the embodiments of the present disclosure and the characteristics in the embodiments can be arbitrarily combined if there is no conflict. Further, though originally targeted at LAA communication, methods and devices in the present disclosure are also applicable to communication on licensed spectrum, such as Device to Device (D2D).

The present disclosure provides a method in a first node for wireless communication, comprising:
  receiving a first signaling; and
  operating a first radio signal;
  herein, the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the operating is related to a type of multicarrier symbols occupied by the first radio signal; K is a positive integer greater than 1, K1 is a positive integer not greater than the K; the operating is receiving, or the operating is transmitting.

In one embodiment, an advantage of the above method lies in that the time duration of the first time window and a type of multicarrier symbols comprised by the first time window are simultaneously indicated by a first signaling, thus reducing signaling overhead and simplifying the operation at the receiving side, and further avoiding excessive blind detection.

According to one aspect of the present disclosure, the above method is characterized in that the K1 is equal to the K, and the K first-type time units are the K1 first-type time units respectively; any of the K1 type indicator sets only comprises 1 type indicator; the second field comprises P information bits, the P information bits are used for determining K1 type indicators corresponding to the K1 type indicator sets; P is unrelated to the time duration of the first time window in time domain, a number of multicarrier symbols comprised by any of the K first-type time units is related to the time duration of the first time window in time domain; the P is a positive integer larger than 1.

In one embodiment, an advantage of the above method lies in that existing indication mode of SFI is maintained in the second field, and only one SFI is used for indicating all slots covered by the first time window; besides, the payload of the second field is fixed, while ensuring the flexibility of indication, the design of the first signaling is also streamlined, hence a decrease in the first signaling overhead.

According to one aspect of the present disclosure, the above method is characterized in that the K1 is no greater than the K; the second field also comprises a first sub-field, the first sub-field is used for determining the K1 first-type time unit(s) out of the K first-type time units; the K1 type indicator set(s) is(are) respectively used for indicating a type(s) of multicarrier symbols comprised by the K1 first-type time unit(s); any of the K first-type time units is a slot.

In one embodiment, an advantage of the above method lies in that through the first sub-field, only K1 first-type time unit(s) comprising uplink and downlink shift point(s) is(are) indicated, and then only SFI(s) corresponding to the indicated K1 first-type time unit(s) is(are) indicated, thus ensuring the flexibility of uplink and downlink configuration within a first time window without changing the present SFI design.

According to one aspect of the present disclosure, the above method is characterized in comprising:
  detecting a target radio signal;
  herein, a first sequence is used for generating the target radio signal, the first sequence is a characteristic sequence, and a detection on the target radio signal is a coherent detection; the operating is receiving and the first radio signal comprises a physical layer control signaling, the target radio signal is used for determining to receive the first radio signal; a candidate first-type time unit is an earliest first-type time unit of the K1 first-type time units in time domain; time domain resources occupied by the target radio signal belong to a target first-type time unit, the target first-type time unit is located after the candidate first-type time unit in time domain.

In one embodiment, an advantage of the above method lies in that for the first node, when the process of receiving a radio signal starts with the triggering of a sequence (for example, employing the target radio signal to trigger the reception of subsequent control signaling in downlink), the second field of the first signaling will be able to further shrink the coverage of reception of the target radio signal requested by the first node, thereby decreasing the complexity of implementing the first node.

In one embodiment, a technical feature of the above method is that in the first time window, time domain resources located before the first shift point between uplink and downlink is sure of being occupied by a transmitter of the first signaling, such as a base station, so the first node, instead of performing detection on the target radio signal, can directly perform blind detection on the control signaling; therefore, the reception of the first node will be less complicated.

According to one aspect of the present disclosure, the above method is characterized in that the operating is receiving and the first radio signal comprises a physical layer control signaling, a candidate first-type time unit is an earliest first-type time unit of the K1 first-type time units in time domain; the target first-type time unit is located before the candidate first-type time unit in time domain, or the target first-type time unit is the candidate first-type time unit, the first node does not perform coherent detection on the characteristic sequence before receiving the first radio signal.

In one embodiment, a technical feature of the above method is that in the first time window, time domain resources located after the first shift point between uplink and downlink may comprise time domain resources configured to uplink by a transmitter of the first signaling, such as a base station, the transmitter of the first signaling cannot ensure that the time domain resources located after the first shift point between uplink and downlink is occupied; therefore, the first node has to perform a detection on the target radio signal to avoid unnecessary blind detection.

The present disclosure provides a method in a second node for wireless communication, comprising:
  transmitting a first signaling; and
  executing a first radio signal;
  herein, the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the operating is related to a type of multicarrier symbols occupied by the first radio signal; K is a positive integer greater than 1, K1 is a positive integer not greater than the K; the executing is transmitting, or the executing is receiving.

According to one aspect of the present disclosure, the above method is characterized in that the K1 is equal to the K, and the K first-type time units are the K1 first-type time units respectively; any of the K1 type indicator sets only comprises 1 type indicator; the second field comprises P information bits, the P information bits are used for determining K1 type indicators corresponding to the K1 type indicator sets; P is unrelated to the time duration of the first time window in time domain, a number of multicarrier symbols comprised by any of the K first-type time units is related to the time duration of the first time window in time domain; the P is a positive integer larger than 1.

According to one aspect of the present disclosure, the above method is characterized in that the K1 is no greater than the K; the second field also comprises a first sub-field, the first sub-field is used for determining the K1 first-type time unit(s) out of the K first-type time units; the K1 type indicator set(s) is(are) respectively used for indicating a type(s) of multicarrier symbols comprised by the K1 first-type time unit(s); any of the K first-type time units is a slot.

According to one aspect of the present disclosure, the above method is characterized in comprising:
  transmitting a target radio signal;
  herein, a first sequence is used for generating the target radio signal, the first sequence is a characteristic sequence, and a detection on the target radio signal is a coherent detection; the executing is transmitting and the first radio signal comprises a physical layer control signaling, the target radio signal is used for determining to receive the first radio signal; a candidate first-type time unit is an earliest first-type time unit of the K1 first-type time units in time domain; time domain resources occupied by the target radio signal belong to a target first-type time unit, the target first-type time unit is located after the candidate first-type time unit in time domain.

According to one aspect of the present disclosure, the above method is characterized in that the executing is transmitting and the first radio signal comprises a physical layer control signaling, a candidate first-type time unit is an earliest first-type time unit of the K1 first-type time units in time domain; the target first-type time unit is located before the candidate first-type time unit in time domain, or the target first-type time unit is the candidate first-type time unit, the second node does not transmit a characteristic sequence that triggers a monitoring on the first radio signal before transmitting the first radio signal.

According to one aspect of the present disclosure, the above method is characterized in comprising:
  performing channel detection within a first frequency domain bandwidth;
  wherein frequency domain resources occupied by the first signaling belong to the first frequency domain bandwidth, the channel detection is used for determining that the first frequency domain bandwidth is idle.

The present disclosure provides a first node for wireless communication, comprising:
  a first receiver, receiving a first signaling; and
  a first transceiver, operating a first radio signal;
  herein, the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the operating is related to a type of multicarrier symbols occupied by the first radio signal; K is a positive integer greater than 1, K1 is a positive integer not greater than the K; the operating is receiving, or the operating is transmitting.

The present disclosure provides a second node for wireless communication, comprising:

a second transceiver, transmitting a first signaling; and a third transceiver, executing a first radio signal;

herein, the first signaling is a physical signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the operating is related to a type of multicarrier symbols occupied by the first radio signal; K is a positive integer greater than 1, K1 is a positive integer not greater than the K; the executing is transmitting, or the executing is receiving.

In one embodiment, the present disclosure has the following advantages over conventional schemes:

A first signaling is used to indicate both time duration of the first time window and a type of multicarrier symbols comprised by the first time window, thus reducing signaling overhead, streamlining the operation at the receiving side, and avoiding redundant blind detection.

As a method, the current indicating mode of SFI is maintained in the second field, and only one SFI is used to indicate all slots covered by the first time window; and since the payload of the second field is a constant, the design of the first signaling can be simplified and the overhead of the first signaling will be cut down on the premise that flexible indication is guaranteed.

As another method, the first sub-field is used to indicate only K1 first-type time unit(s) comprising uplink and downlink shift point(s), and then to indicate only SFI(s) corresponding to the indicated K1 first-type time unit(s), thus ensuring the flexibility of uplink and downlink configuration within a first time window without changing the present SFI design.

As described in the scheme of the present disclosure, for time domain resources located before the first shift point between uplink and downlink in the first time window, the first node does not need to perform detection on the target radio signal, instead, a direction blind detection on the control signaling will be sufficient to reduce the complexity of the reception of the first node; however, time domain resources located after the first shift point between uplink and downlink may comprise time domain resources configured to uplink by a transmitter of the first signaling, so that the transmitter of the first signaling cannot make sure of occupying the time domain resources, as a result, the first node is required to perform detection on the target radio signal to avoid unnecessary blind detection.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
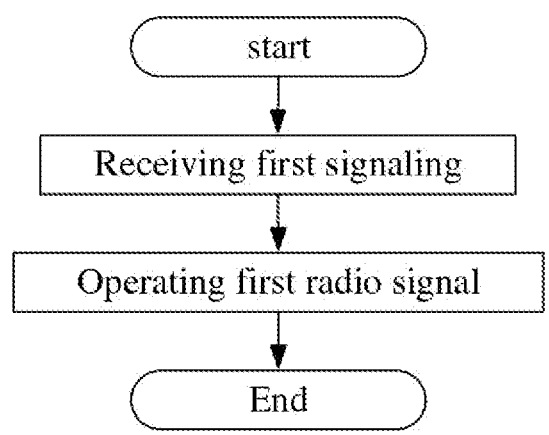
FIG. 1 illustrates a flowchart of a first signaling according to one embodiment of the present disclosure.

Embodiment 1 illustrates a flowchart of a first signaling, as shown in FIG. 1.

In Embodiment 1, the UE in the present disclosure first receives a first signaling; and then operates a first radio signal; the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s)

is(are) respectively used for indicating a type(s) of multicarrier symbols comprised by the K1 first-type time unit(s); the operating is related to a type of multicarrier symbols occupied by the first radio signal; K is a positive integer greater than 1, K1 is a positive integer not greater than the K; the operating is receiving, or the operating is transmitting.

In one embodiment, the first field comprises Q information bit(s), Q is a positive integer, the Q is related to subcarrier spacing(s) employed by a radio signal(s) transmitted in the first time window.

In one embodiment, the first field comprises Q information bit(s), Q is a positive integer, the Q is related to a maximum time duration of the first time window in time domain.

In one embodiment, the first time window lasts no more than T1 ms in time domain, the first field comprises Q information bit(s), the Q is a smallest integer no less than $\log_2(T1)$.

In one subembodiment, the T1 is a positive integer.

In one embodiment, a number of slot(s) occupied by the first time window in time domain is no greater than T2, the first field comprises Q information bit(s), the Q is a smallest integer no less than $\log_2(T2)$.

In one subembodiment, the T2 is a positive integer.

In one embodiment, the first type represents that one or more multicarrier symbols corresponding to the first type are used for downlink transmission.

In one embodiment, the second type represents that one or more multicarrier symbols corresponding to the second type are used for uplink transmission.

In one embodiment, types included by the third type represent that one or more multicarrier symbols corresponding to the third type can be used not only for uplink transmission but also for downlink transmission.

In one embodiment, types included by the third type represent that one or more multicarrier symbols corresponding to the third type do not belong to a COT.

In one embodiment, a type comprising one or more multicarrier symbols is the first type, the first node receives a radio signal in the one or more multicarrier symbols.

In one embodiment, a type comprising one or more multicarrier symbols is the second type, the first node transmits a radio signal in the one or more multicarrier symbols.

In one embodiment, a type comprising one or more multicarrier symbols is the third type, the first node receives a radio signal in the one or more multicarrier symbols, or the first node transmits a radio signal in the one or more multicarrier symbols.

In one embodiment, any of the K1 type indicator set(s) is used for indicating M types respectively employed by M multicarrier symbol sets, M is a positive integer.

In one subembodiment of the above embodiment, any of the M types is one of the first type, the second type and the third type.

In one subembodiment of the above embodiment, the M is equal to 14.

In one subembodiment of the above embodiment, any of the M multicarrier symbol sets comprises a positive integer number of multicarrier symbol(s).

In one embodiment, the multicarrier symbol in the present disclosure is an Orthogonal Frequency Division Multiplexing (OFDM) symbol.

In one embodiment, the multicarrier symbol in the present disclosure is a Single-Carrier Frequency Division Multiple Access (SC-FDMA) symbol.

In one embodiment, the multicarrier symbol in the present disclosure is a Filter Bank Multi Carrier (FBMC) symbol.

In one embodiment, the multicarrier symbol in the present disclosure is a Cyclic Prefix (CP)-included OFDM symbol.

In one embodiment, the multicarrier symbol in the present disclosure is one of CP-included Discrete Fourier Transform Spreading Orthogonal Frequency Division Multiplexing (DFT-s-OFDM) symbols.

In one embodiment, the phrase that the K1 type indicator set(s) is(are) respectively used for indicating a type(s) of multicarrier symbols comprised by the K1 first-type time unit(s) comprises: a given type indicator set is any type indicator set out of the K1 type indicator set(s), the given type indicator set corresponds to a given first-type time unit of the K1 first-type time unit(s), the given type indicator set is used for indicating a type of multicarrier symbols comprised by the given first-type time unit.

In one subembodiment of the above embodiment, the given type indicator set only comprises one type indicator, all multicarrier symbols comprised by the given first-type time unit are of the same type; the type indicator is used for determining that the type of all multicarrier symbols comprised by the given first-type time unit is the first type, or the type indicator is used for determining that the type of all multicarrier symbols comprised by the given first-type time unit is the second type, or the type indicator is used for determining that the type of all multicarrier symbols comprised by the given first-type time unit is the third type.

In one subembodiment of the above embodiment, the given type indicator set comprises M type indicators; the given first-type time unit comprises M multicarrier symbols, the M type indicators are respectively used for indicating types of the M multicarrier symbols.

In one subsidiary embodiment of the above embodiment, the M is equal to 14.

In one subsidiary embodiment of the above embodiment, the given type indicator is any of the M type indicators, the given type indicator corresponds to a given multicarrier symbol out of the M multicarrier symbols; the given type indicator is used for indicating that the type of the given multicarrier symbol is a first type, or the given type indicator is used for indicating that the type of the given multicarrier symbol is a second type, or the given type indicator is used for indicating that the type of the given multicarrier symbol is a third type.

In one embodiment, any of the K1 type indicator set(s) only comprises 1 type indicator, the K1 type indicator set(s) respectively corresponds (correspond) to K1 type indicator(s), any of the K1 type indicator(s) is identified as one of "D", "U" and "X".

In one subembodiment, the "D" corresponds to the first type.

In one subembodiment, the "U" corresponds to the second type.

In one subembodiment, the "X" corresponds to the third type.

In one embodiment, any of the K1 type indicator set(s) comprises M type indicator(s), any of the M type indicator(s) is identifier as one of "D", "U" and "X".

In one subembodiment, the "D" corresponds to the first type.

In one subembodiment, the "U" corresponds to the second type.

In one subembodiment, the "X" corresponds to the third type.

In one embodiment, the first signaling is a piece of DCI.

In one embodiment, a physical layer channel occupied by the first signaling includes a Physical Downlink Control Channel (PDCCH).

In one embodiment, a physical layer channel occupied by the first signaling includes a Physical Downlink Shared Channel (PDSCH).

In one subembodiment, the first signaling is group-common DCI.

In one subembodiment, the first signaling comprises Cyclic Redundancy Check (CRC), wherein the CRC is scrambled by a Slot Format Indicator Radio Network Temporary Identifier (SFI-RNTI).

In one subembodiment, the first signaling comprises Cyclic Redundancy Check (CRC), wherein the CRC is scrambled by a given sequence, the given sequence is known to all UEs served by a transmitter of the first signaling.

In one embodiment, the first signaling is a piece of Sidelink Control Information (SCI).

In one embodiment, the first signaling is a Physical Sidelink Control Channel (PSCCH).

In one embodiment, a DCI format employed by the first signaling is DCI Format 2_0.

In one embodiment, the first node is a terminal.

In one embodiment, the first node is a UE.

In one embodiment, the first node is a vehicle.

In one embodiment, the first node need not perform LBT before wireless transmission in the first time window.

In one embodiment, the first node, before performing a wireless transmission in the first time window, does not determine through Cat 4 LBT whether frequency domain resources occupied by the wireless transmission is idle.

In one embodiment, the first node, before performing a wireless transmission in the first time window, determines through Cat 2 LBT whether frequency domain resources occupied by the wireless transmission is idle.

In one embodiment, the first node, before performing a wireless transmission in the first time window, determines only through random backoff-excluded LBT whether or not frequency domain resources occupied by the wireless transmission is idle.

Embodiment 2

Figure 2:
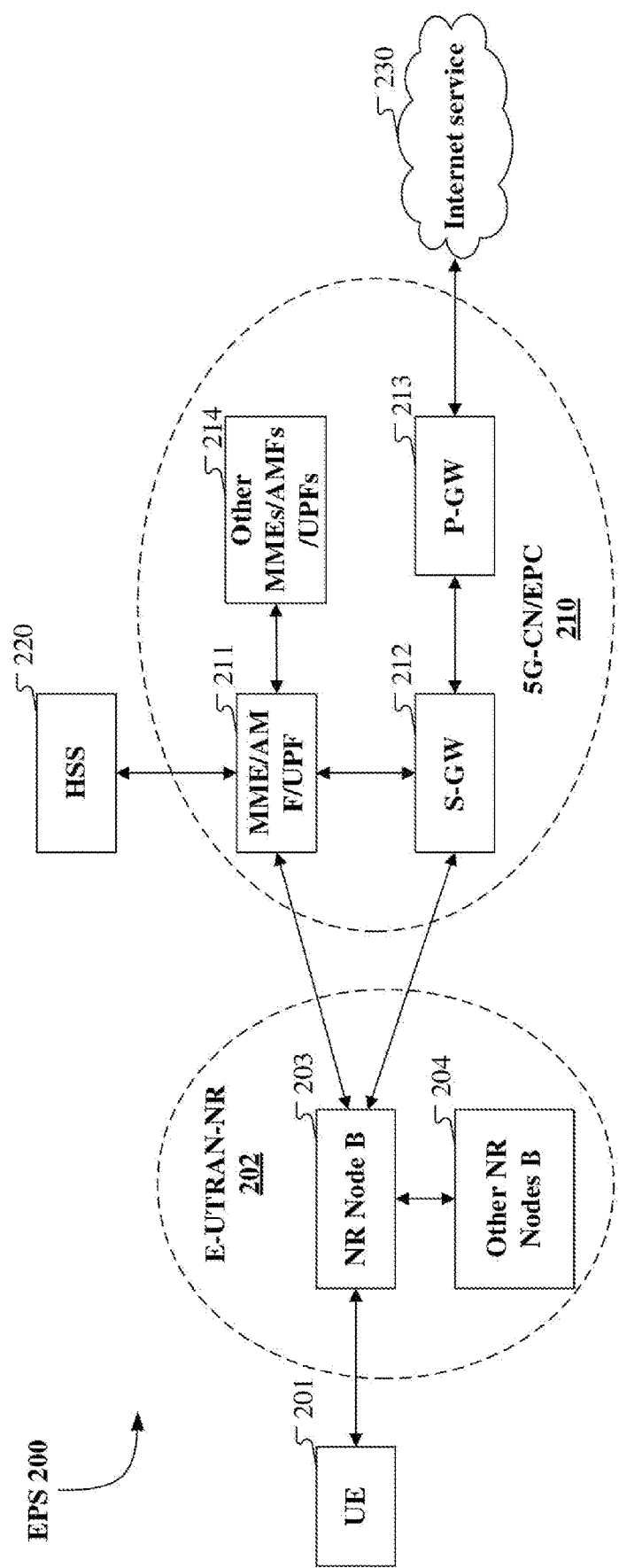
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or other applicable terminology. The EPS 200 may comprise one or more UEs 201, an NG-RAN 202, a 5G-Core/Network Evolved Packet Core (5G-CN/EPC) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The 5G-CN/EPC 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the gNB 203 corresponds to the second node in the present disclosure.

In one embodiment, the UE 201 supports wireless communication on unlicensed spectrum.

In one embodiment, the gNB 203 supports communication on unlicensed spectrum.

In one embodiment, the UE 201 supports LBT.

In one embodiment, the gNB 203 supports LBT.

In one embodiment, the UE 201 supports simultaneous transmission on multiple Component Carriers (CCs).

In one embodiment, the UE 201 supports simultaneous transmission on multiple Bandwidth Parts (BWPs).

In one embodiment, the gNB 203 supports simultaneous transmission on multiple CCs.

In one embodiment, the gNB 203 supports simultaneous transmission on multiple BWPs.

Embodiment 3

Figure 3:
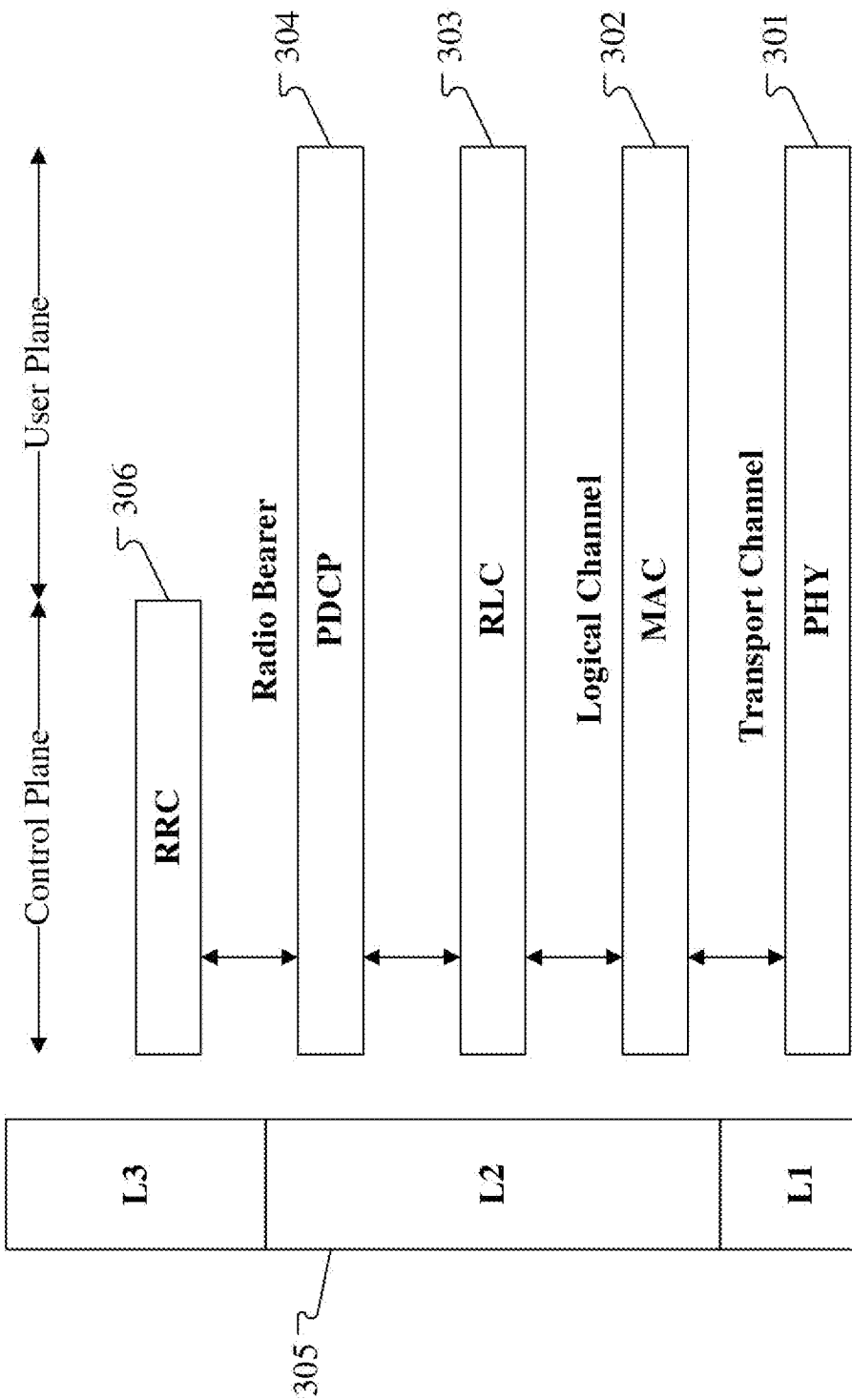
FIG. 3 illustrates a schematic diagram of an example of a radio protocol architecture of a user plane and a control plane according to one embodiment of the present disclosure.

Embodiment 3 illustrates a schematic diagram of an example of a radio protocol architecture of a user plane and a control plane according to the present disclosure, as shown in FIG. 3.

FIG. 3 is a schematic diagram illustrating an embodiment of a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY 301.

In one embodiment, the first radio signal in the present disclosure is generated by the PHY 301.

In one embodiment, the first radio signal in the present disclosure is generated by the MAC sublayer 302.

In one embodiment, the target radio signal in the present disclosure is generated by the PHY 301.

Embodiment 4

Figure 4:
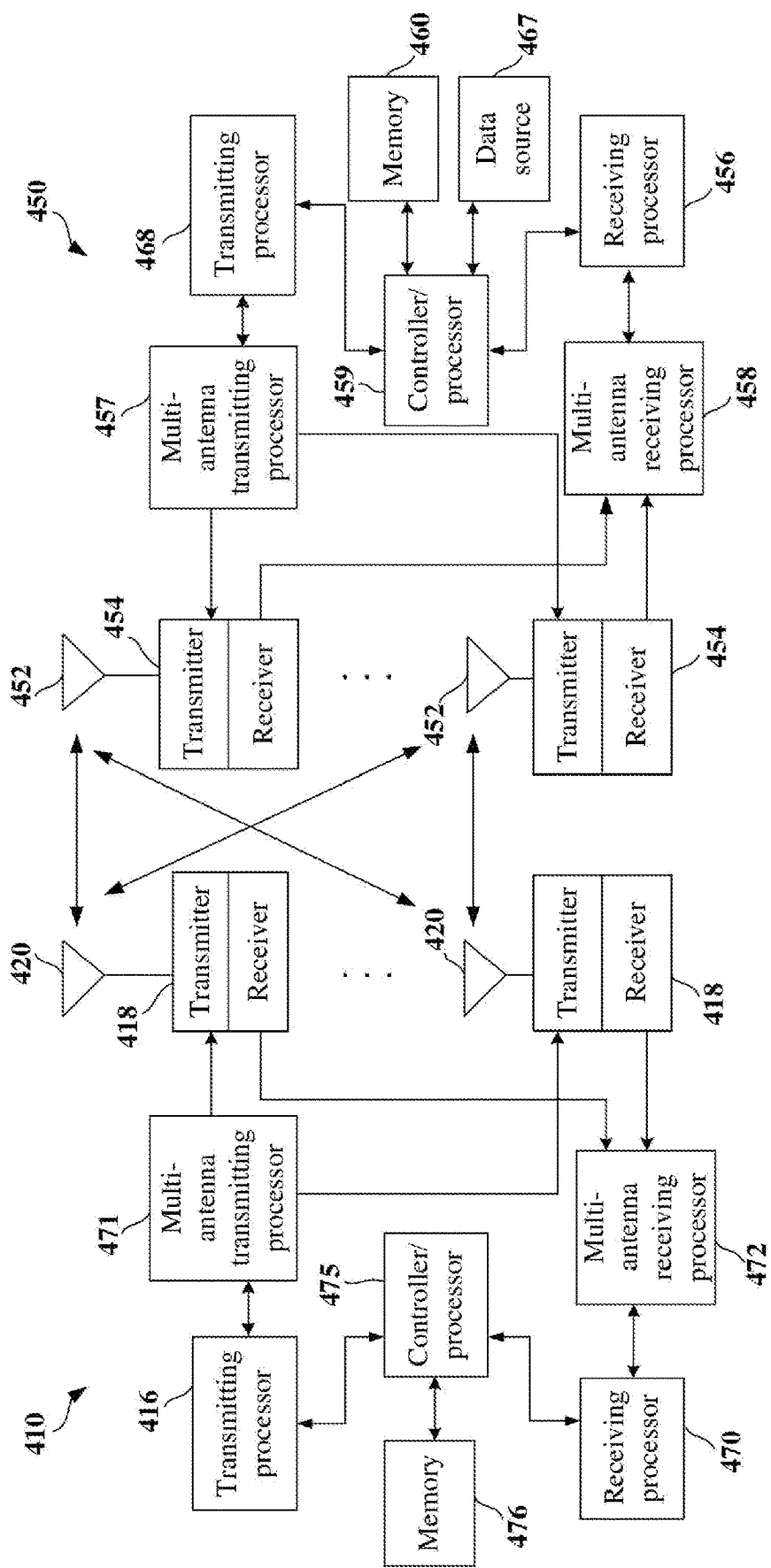
FIG. 4 illustrates a schematic diagram of an NR node and a UE according to one embodiment of the present disclosure.

Embodiment 4 illustrates a schematic diagram of a base station (NR node) and a UE according to the present disclosure, as shown in FIG. 4; FIG. 4 is a block diagram of a second node 410 in communication with a first node 450 in an access network.

The second node 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The first node 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In Downlink (DL) transmission, at the second node 410, a higher layer packet from a core network is provided to the controller/processor 475. The controller/processor 475 implements the functionality of the L2 layer. In DL, the controller/processor 475 provides header compression, encryption, packet segmentation and reordering, multiplexing between a logical channel and a transport channel and radio resource allocation of the first node 450 based on various priorities. The controller/processor 475 is also in charge of HARQ operation, a retransmission of a lost packet and a signaling to the first node 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the first node 450 side and the mapping to signal clusters corresponding to each modulation scheme (i.e., BPSK, QPSK, M-PSK, and M-QAM, etc.). The multi-antenna transmitting processor 471 performs digital spatial precoding/beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In DL transmission, at the first node 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first node 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In DL transmission, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In Uplink (UL) transmission, at the first node 450, the data source 467 is configured to provide a higher-layer packet to the controller/processor 459. The data source 467 represents all protocol layers above the L2 layer. Similar to a transmitting function of the second node 410 described in DL transmission, the controller/processor 459 performs header compression, encryption, packet segmentation and reordering, and multiplexing between a logical channel and a transport channel based on radio resource allocation of the second node 410 so as to provide the L2 layer functions used for the user plane and the control plane. The controller/processor 459 is also responsible for HARQ operation, retransmission of a lost packet, and a signaling to the second node 410. The transmitting processor 468 performs modulation and mapping, as well as channel coding, and the multi-antenna transmitting processor 457 performs digital multi-antenna spatial precoding/beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In UL transmission, the function of the second node 410 is similar to the receiving function of the first node 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides demultiplexing between a transport channel and a logical channel, packet reassembling, decrypting, header decompression, control signal processing so as to recover a higher-layer packet from the first node 450. The higher-layer packet coming from the controller/processor 475 may be provided to the core network. The controller/processor 475 can also perform error detection using ACK and/or NACK protocols to support HARQ operation.

In one embodiment, the first node 450 comprises at least one processor and at least one memory. The at least one memory includes computer program codes. The at least one memory and the computer program codes are configured to be used in collaboration with the at least one processor. The first node 450 at least receives a first signaling and operates a first radio signal; the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the operating is related to a type of multicarrier symbols occupied by the first radio signal; K is a positive integer greater than 1, K1 is a positive integer not greater than the K; the operating is receiving, or the operating is transmitting.

In one embodiment, the first node 450 comprises a memory that stores a computer readable instruction program. The computer readable instruction program generates an action when executed by at least one processor. The action includes: receiving a first signaling and operating a first radio signal; the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the operating is related to a type of multicarrier symbols occupied by the first radio signal; K is a positive integer greater than 1, K1 is a positive integer not greater than the K; the operating is receiving, or the operating is transmitting.

In one embodiment, the second node 410 comprises at least one processor and at least one memory. The at least one memory includes computer program codes. The at least one memory and the computer program codes are configured to be used in collaboration with the at least one processor. The second node 410 at least transmits a first signaling and executes a first radio signal; the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the operating is related to a type of multicarrier symbols occupied by the first radio signal; K is a positive integer greater than 1, K1 is a positive integer not greater than the K; the executing is transmitting, or the executing is receiving.

In one embodiment, the second node 410 comprises a memory that stores a computer readable instruction program. The computer readable instruction program generates an action when executed by at least one processor. The action includes: transmitting a first signaling and executing a first radio signal; the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the operating is related to a type of multicarrier symbols occupied by the first radio signal; K is a positive integer greater than 1, K1 is a positive integer not greater than the K; the executing is transmitting, or the executing is receiving.

In one embodiment, the first node 450 corresponds to the first node in the present disclosure.

In one embodiment, the second node 410 corresponds to the second node in the present disclosure.

In one embodiment, at least one of the antenna 452, the receiver 454, the multi-antenna receiving processor 458 or the receiving processor 456 is used for receiving a first signaling; at least one of the antenna 420, the transmitter 418, the multi-antenna transmitting processor 471 or the transmitting processor 416 is used for transmitting a first signaling.

In one embodiment, at least one of the antenna 452, the receiver 454, the multi-antenna receiving processor 458 or the receiving processor 456 is used for receiving a first radio signal; at least one of the antenna 420, the transmitter 418, the multi-antenna transmitting processor 471 or the transmitting processor 416 is used for transmitting a first radio signal.

In one embodiment, at least one of the antenna 452, the transmitter 454, the multi-antenna transmitting processor 457 or the transmitting processor 468 is used for transmitting a first radio signal; at least one of the antenna 420, the receiver 418, the multi-antenna receiving processor 472 or the receiving processor 470 is used for receiving a first radio signal.

In one embodiment, at least one of the antenna 452, the receiver 454, the multi-antenna receiving processor 458 or the receiving processor 456 is used for detecting a target radio signal; at least one of the antenna 420, the transmitter 418, the multi-antenna transmitting processor 471 or the transmitting processor 416 is used for transmitting a target radio signal.

In one embodiment, at least one of the antenna 420, the receiver 418, the multi-antenna receiving processor 472, the receiving processor 470 or the controller/processor 475 is used for performing channel detection within a first frequency domain bandwidth.

Embodiment 5

Figure 5:
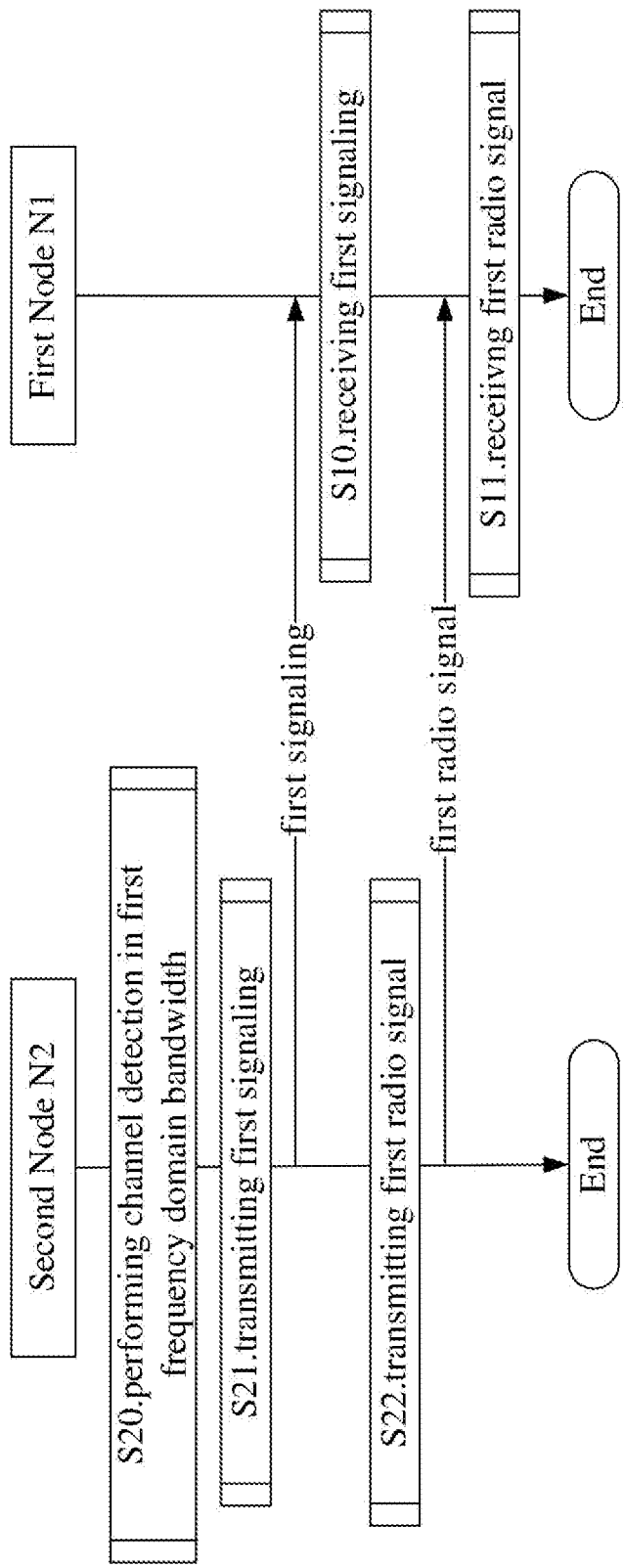
FIG. 5 illustrates a flowchart of wireless transmission according to one embodiment of the present disclosure.

Embodiment 5 illustrates a flowchart of wireless transmission, as shown in FIG. 5. In FIG. 5, a first node N1 is in communication with a second node N2.

The first node N1 receives a first signaling in step S10; and receives a first radio signal in step S11.

The second node N2 performs channel detection within a first frequency domain bandwidth in step S20; transmits a first signaling in step S21; and transmits a first radio signal in step S22.

In Embodiment 5, the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); K is a positive integer greater than 1, K1 is a positive integer not greater than the K; frequency domain resources occupied by the first signaling belong to the first frequency domain bandwidth, the channel detection is used for determining that the first frequency domain bandwidth is idle.

In one embodiment, the first radio signal comprises a physical layer control signaling, a candidate first-type time unit is an earliest first-type time unit of the K1 first-type time units in time domain; the target first-type time unit is located before the candidate first-type time unit in time domain, or the target first-type time unit is the candidate first-type time unit, the first node N1 does not perform coherent detection on a characteristic sequence before receiving the first radio signal; the second node N2 does not transmit a characteristic sequence that triggers a monitoring on the first radio signal before transmitting the first radio signal.

In one subembodiment of the above embodiment, the target first-type time unit comprises W1 multicarrier symbol(s) of the first type and W2 multicarrier symbol(s) of a type other than the first type; any of the W2 multicarrier symbol(s) is located after any of the W1 multicarrier symbol(s) in time domain; W1 and W2 are both positive integers.

In one subembodiment of the above embodiment, the phrase that "the second node N2 does not transmit a characteristic sequence that triggers a monitoring on the first radio signal before transmitting the first radio signal" comprises: the first node N1 does not perform blind detection on the first radio signal if the characteristic sequence is not detected.

In one subembodiment of the above embodiment, the phrase that "the second node N2 does not transmit a characteristic sequence that triggers a monitoring on the first radio signal before transmitting the first radio signal" comprises: the first radio signal is a unicast signal for the first node in the present disclosure.

In one subembodiment of the above embodiment, the phrase that "the second node N2 does not transmit a characteristic sequence that triggers a monitoring on the first radio signal before transmitting the first radio signal" comprises: the first node N1 belongs to a first terminal group, the first radio signal is a groupcast signal for the first terminal group.

In one embodiment, a type of multicarrier symbols occupied by the first radio signal is the first type.

In one embodiment, a type of multicarrier symbols occupied by the first radio signal is the third type.

In one embodiment, the K1 is equal to the K, and the K first-type time units are the K1 first-type time units respectively; any of the K1 type indicator sets only comprises 1 type indicator; the second field comprises P information bits, the P information bits are used for determining K1 type indicators corresponding to the K1 type indicator sets; P is unrelated to the time duration of the first time window in time domain, a number of multicarrier symbols comprised by any of the K first-type time units is related to the time duration of the first time window in time domain; the P is a positive integer larger than 1.

In one subembodiment of the above embodiment, the P is fixed, or the P is configured via a higher layer signaling.

In one subembodiment of the above embodiment, the P is equal to 16.

In one subembodiment of the above embodiment, the second field is used for indicating a format out of TS 38.213 Table 11.1.1-1, the indicated format is used for determining the K1 type indicators, the K1 is equal to 14.

In one subembodiment, the K1 is equal to 14.

In one subembodiment, any two of the K first-type time units comprise an equal number of multicarrier symbols.

In one subembodiment, multicarrier symbols comprised by any of the K first-type time units are consecutive in time domain.

In one subembodiment, time duration of the first time window is T3 ms, and any of the K first-type time units comprises L1 multicarrier symbols, L1 is linear with T3; the L1 and the T3 are both positive integers.

In one subsidiary embodiment of the above subembodiment, the L1 increases as the T3 increases.

In one subsidiary embodiment of the above subembodiment, the L1 decreases as the T3 decreases.

In one subembodiment, a subcarrier spacing employed by a radio signal transmitted in the first time window is F1 kHz, and any of the K first-type time units comprises L1 multicarrier symbols, L1 is linear with F1; the L1 and the F1 are both positive integers.

In one subsidiary embodiment of the above subembodiment, the L1 increases as the F1 increases.

In one subsidiary embodiment of the above subembodiment, the L1 decreases as the F1 decreases.

In one subsidiary embodiment of the above subembodiment, the F1 is one of 15, 30, 60, 120 and 180.

In one subembodiment of the above embodiment, the K1 type indicator(s) is(are) respectively used for determining a type(s) of multicarrier symbols comprised by the K1 first-type time unit set(s).

In one subsidiary embodiment of the above subembodiment, multicarrier symbols comprised in any of the K1 first-type time unit set(s) employs a same type.

In one embodiment, the K1 is no greater than the K; the second field also comprises a first sub-field, the first sub-field is used for determining the K1 first-type time unit(s) out of the K first-type time units; the K1 type indicator set(s) is(are) respectively used for indicating a type(s) of multicarrier symbols comprised by the K1 first-type time unit(s); any of the K first-type time units is a slot.

In one subembodiment of the above embodiment, any of the K1 type indicator set(s) comprises M type indicators, the M is a fixed positive integer.

In one subsidiary embodiment of the above subembodiment, the M is equal to 14.

In one subsidiary embodiment of the above subembodiment, the M type indicators are respectively used for indicating types of corresponding M multicarrier symbols.

In one subsidiary embodiment of the above subembodiment, one of the M type indicators is used for determining that corresponding multicarrier symbols are of one type out of the first type, the second type and the third type.

In one subembodiment of the above embodiment, the second field also comprises K1 second sub-field(s), the K1 second sub-field(s) is(are) respectively used for indicating the K1 type indicator set(s); any of the K1 second sub-field(s) is used for determining a slot format.

In one subsidiary embodiment of the above subembodiment, any of the K1 second sub-field(s) comprises 16 information bits.

In one subsidiary embodiment of the above subembodiment, any of the K1 second sub-field(s) comprises 8 information bits.

In one subsidiary embodiment of the above subembodiment, the slot format corresponds to a format from TS 38.213 Table 11.1.1-1.

In one subsidiary embodiment of the above subembodiment, any of the K1 second sub-field(s) comprises P information bits, the P information bits are used for indicating a format out of TS 38.213 Table 11.1.1-1.

In one subembodiment of the above embodiment, the K1 is less than the K, K2 is a difference between the K and the K1. First-type time unit(s) of the K first-type time units other than the K1 first-type time unit(s) corresponds (correspond) to K2 first-type time unit(s), a type of multicarrier symbols comprised by any of the K2 first-type time unit(s) is the first type.

In one embodiment, the first node N1 is a terminal.

In one embodiment, the first node N1 is a UE.

In one embodiment, the first node N1 is a vehicle.

In one embodiment, the second node N2 is a base station.

In one embodiment, the second node N2 is a Road Size Unit (RSU).

In one embodiment, the second node N2 is a Group Head.

In one embodiment, the second node N2 is a vehicle.

In one embodiment, the first frequency domain bandwidth belongs to unlicensed spectrum.

In one embodiment, the channel detection is energy detection.

In one embodiment, the channel detection is LBT.

In one embodiment, the channel detection is Channel Clear Access (CCA).

In one embodiment, the first radio signal is a physical layer control signaling, the phrase that the first node N1 receives the first radio signal means that the first node N1 performs blind detection on the first radio signal.

Embodiment 6

Figure 6:
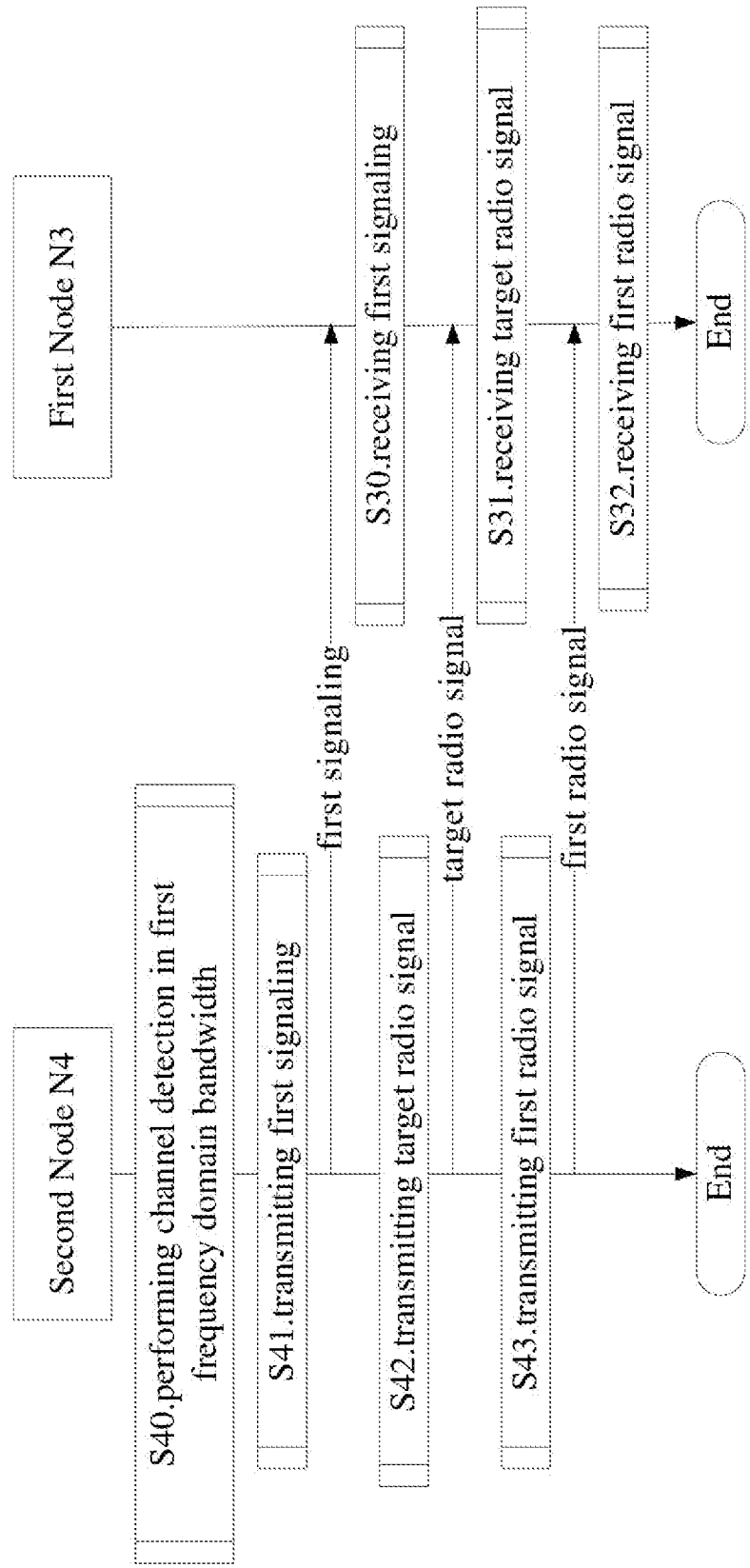
FIG. 6 illustrates a flowchart of wireless transmission according to another embodiment of the present disclosure.

Embodiment 6 illustrates another flowchart of wireless transmission, as shown in FIG. 6. In FIG. 6, the first node N3 and the second node N4 are in wireless communication with each other. The embodiments, subembodiments and subsidiary embodiments in Embodiment 5 can be applied to Embodiment 6 if no conflict is incurred.

The first node N3 receives a first signaling in step S30; detects a target radio signal in step S31; and receives a first radio signal in step S32.

The second node N4 performs channel detection within a first frequency domain bandwidth in step S40; transmits a first signaling in step S41; transmits a target radio signal in step S42; and transmits a first radio signal in step S43.

In Embodiment 6, the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); K is a positive integer greater than 1, K1 is a positive integer not greater than the K; a first sequence is used for generating the target radio signal, the first sequence is a characteristic sequence, and a detection on the target radio signal is a coherent detection; the first radio signal comprises a physical layer control signaling, the target radio signal is used for determining to receive the first radio signal; a candidate first-type time unit is an earliest first-type time unit of the K1 first-type time units in time domain; time domain resources occupied by the target radio signal belong to a target first-type time unit, the target first-type time unit is located after the candidate first-type time unit in time domain; time domain resources occupied by the first signaling belong to the first frequency domain bandwidth, the channel detection is used for determining that the first frequency domain bandwidth is idle.

In one embodiment, a type of multicarrier symbols occupied by the first radio signal is the first type.

In one embodiment, a type of multicarrier symbols occupied by the first radio signal is the third type.

In one embodiment, the K1 is equal to the K, and the K first-type time units are the K1 first-type time units respectively; any of the K1 type indicator sets only comprises 1 type indicator; the second field comprises P information bits, the P information bits are used for determining K1 type indicators corresponding to the K1 type indicator sets; P is unrelated to the time duration of the first time window in time domain, a number of multicarrier symbols comprised by any of the K first-type time units is related to the time duration of the first time window in time domain; the P is a positive integer larger than 1.

In one embodiment, the K1 is no greater than the K; the second field also comprises a first sub-field, the first sub-field is used for determining the K1 first-type time unit(s) out of the K first-type time units; the K1 type indicator set(s) is(are) respectively used for indicating a type(s) of multi-carrier symbols comprised by the K1 first-type time unit(s); any of the K first-type time units is a slot.

In one embodiment, the first node N3 is a terminal.
In one embodiment, the first node N3 is a UE.
In one embodiment, the first node N3 is a vehicle.
In one embodiment, the second node N4 is a base station.
In one embodiment, the second node N4 is an RSU.
In one embodiment, the second node N4 is a Group Head.
In one embodiment, the second node N4 is a vehicle.

Embodiment 7

Figure 7:
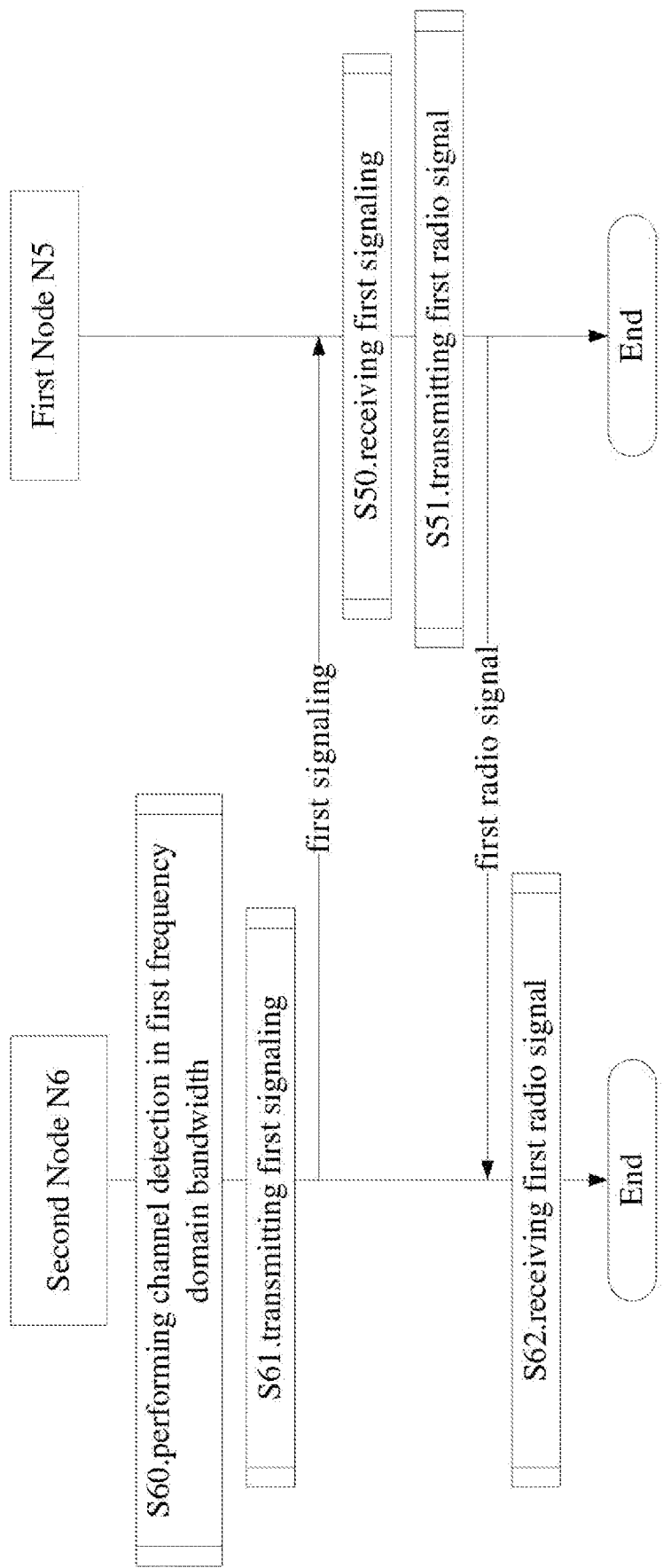
FIG. 7 illustrates a flowchart of wireless transmission according to another embodiment of the present disclosure.

Embodiment 7 illustrates another flowchart of wireless transmission, as shown in FIG. 7. In FIG. 7, a first node N5 and a second node N6 are in wireless communication with each other. The embodiments, subembodiments and subsidiary embodiments in Embodiment 5 can be applied to Embodiment 7 if no conflict is incurred.

The first node N5 receives a first signaling in step S50; and transmits a first radio signal in step S51.

The second node N6 performs channel detection within a first frequency domain bandwidth in step S60; transmits a first signaling in step S61; and receives a first radio signal in step S62.

In Embodiment 7, the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); K is a positive integer greater than 1, K1 is a positive integer not greater than the K; frequency domain resources occupied by the first signaling belong to the first frequency domain bandwidth, the channel detection is used for determining that the first frequency domain bandwidth is idle.

In one embodiment, a type of multicarrier symbols occupied by the first radio signal is the second type.

In one embodiment, the K1 is equal to the K, and the K first-type time units are the K1 first-type time units respectively; any of the K1 type indicator sets only comprises 1 type indicator; the second field comprises P information bits, the P information bits are used for determining K1 type indicators corresponding to the K1 type indicator sets; P is unrelated to the time duration of the first time window in time domain, a number of multicarrier symbols comprised by any of the K first-type time units is related to the time duration of the first time window in time domain; the P is a positive integer larger than 1.

In one embodiment, the K1 is no greater than the K; the second field also comprises a first sub-field, the first sub-field is used for determining the K1 first-type time unit(s) out of the K first-type time units; the K1 type indicator set(s) is(are) respectively used for indicating a type(s) of multi-carrier symbols comprised by the K1 first-type time unit(s); any of the K first-type time units is a slot.

In one embodiment, the first node N5 is a terminal.
In one embodiment, the first node N5 is a UE.
In one embodiment, the first node N5 is a vehicle.
In one embodiment, the second node N6 is a base station.
In one embodiment, the second node N6 is an RSU.
In one embodiment, the second node N6 is a Group Head.
In one embodiment, the second node N6 is a vehicle.

In one embodiment, physical layer channel(s) occupied by the first radio signal includes (include) a Physical Random Access Channel (PRACH).

In one embodiment, physical layer channel(s) occupied by the first radio signal includes (include) a Physical Uplink Control Channel (PUCCH).

In one embodiment, physical layer channel(s) occupied by the first radio signal includes (include) a Physical Uplink Shared Channel (PUSCH).

In one embodiment, the first radio signal is Autonoumous Uplink (AUL)-based uplink transmission.

In one embodiment, the first radio signal is Contention-Based uplink transmission.

In one embodiment, the first radio signal is Grant-Free uplink transmission.

In one embodiment, the first radio signal is uplink transmission with Configured Grant.

Embodiment 8

Figure 8:
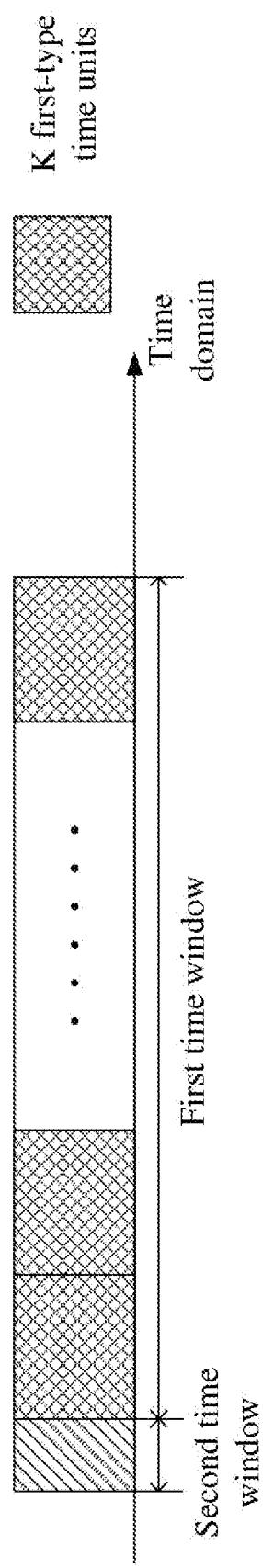
FIG. 8 illustrates a schematic diagram of a first time window according to one embodiment of the present disclosure.

Embodiment 8 illustrates a schematic diagram of a first time window, as shown in FIG. 8; in Embodiment 8, the first time window comprises K first-type time units, and the second time window shown in FIG. 8 is located before the first time window in time domain. The channel detection within the first frequency domain bandwidth in the present disclosure is performed in the second time window.

In one embodiment, the first signaling starts to be transmitted from a start time of the first time window in time domain.

In one embodiment, the second time window and the first time window are consecutive in time domain.

In one embodiment, any two of the K first-type time units have the same time duration in time domain.

In one embodiment, the K first-type time units are K consecutive slots in time domain.

In one embodiment, the K first-type time units are K consecutive subframes in time domain.

In one embodiment, any of the K first-type time units occupied a positive integer number of consecutive multicarrier symbols in time domain.

Embodiment 9

Figure 9:
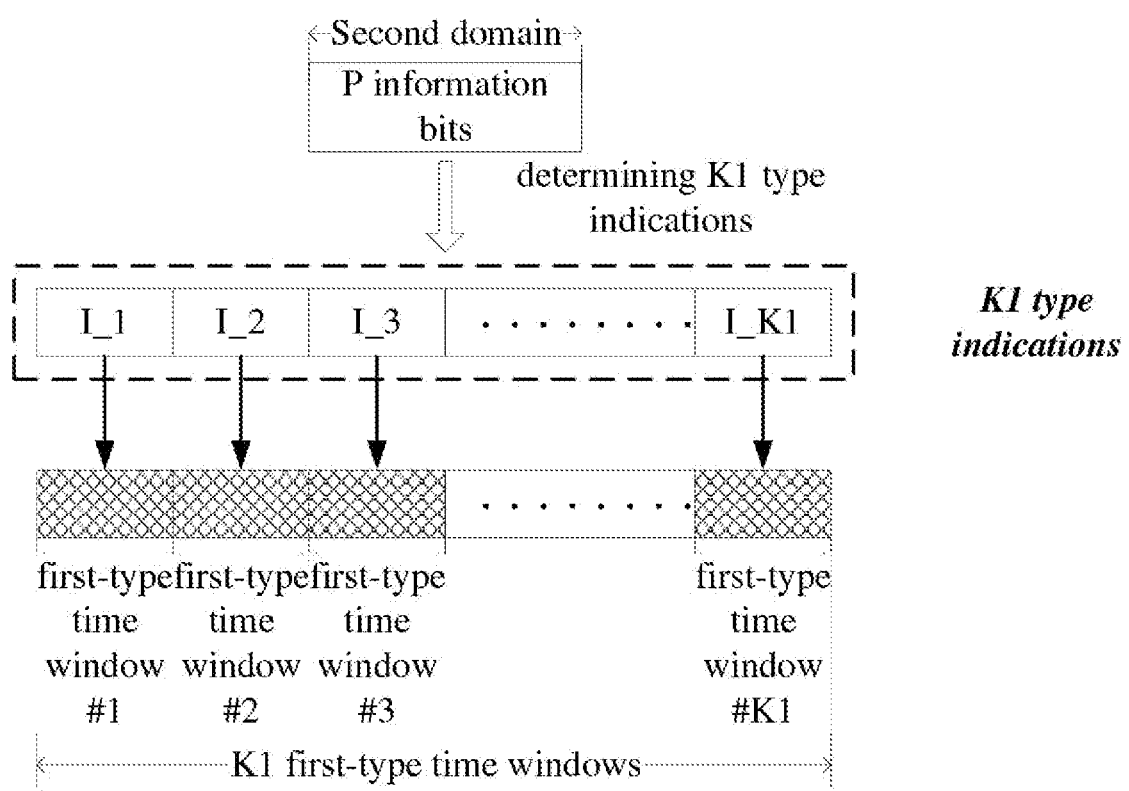
FIG. 9 illustrates a schematic diagram of a second field according to one embodiment of the present disclosure.

Embodiment 9 illustrates a schematic diagram of a second field, as shown in FIG. 9. In FIG. 9, the K1 is equal to the K, and the K first-type time units are the K1 first-type time units respectively; the order in which the K1 first-type time units are arranged in time domain are from first-type time unit #1 to first-type time unit #K1; any of the K1 type indicator sets only comprises 1 type indicator; the second field comprises P information bits, the P information bits are used for determining K1 type indicators corresponding to the K1 type indicator sets; P is unrelated to the time duration of the first time window in time domain, a number of multicarrier symbols comprised by any of the K first-type time units is related to the time duration of the first time window in time domain; the P is a positive integer larger than 1.

In one embodiment, the P is equal to 16, or the P is equal to 8.

In one embodiment, the K1 type indicators in FIG. 9 are I_1, I_2, . . . and I_K1, respectively. Any type indicator of the type indicators I_1 to I_K1 is used for indicating a type of multicarrier symbols comprised by a corresponding first-type time unit.

In one subembodiment, the K1 type indicators are I_1, I_2, . . . and I_K1, respectively. Any type indicator of type indicators I_1 to I_K1 is used for indicating that a type of multicarrier symbols comprised by a corresponding first-type time unit is one of "D", "U" and "X".

In one embodiment, all multicarrier symbols comprised by any of the K1 first-type time unit sets employ a same type.

Embodiment 10

Figure 10:
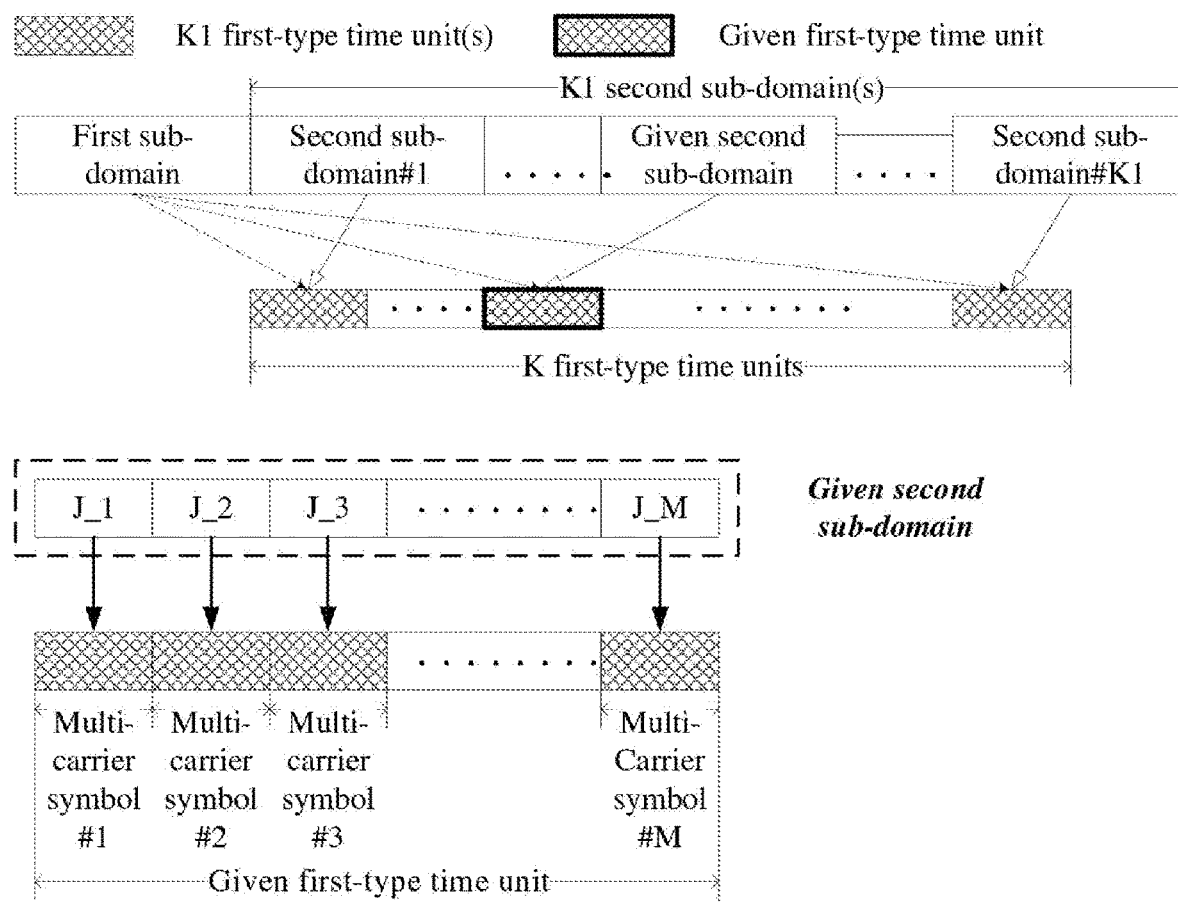
FIG. 10 illustrates a schematic diagram of a second field according to another embodiment of the present disclosure.

Embodiment 10 illustrates another schematic diagram of a second field, as shown in FIG. 10. In FIG. 10, the K1 is no greater than the K; the second field also comprises a first sub-field, the first sub-field is used for determining the K1 first-type time unit(s) out of the K first-type time units; the K1 type indicator set(s) is(are) respectively used for indicating a type(s) of multicarrier symbols comprised by the K1 first-type time unit(s); the second field also comprises K1 second sub-field(s), respectively corresponding to second sub-field(s) from second sub-field #1 to second sub-field #K1 in FIG. 10; the K1 second sub-field(s) is(are) respectively used for indicating the K1 type indicator set(s); any of the K1 second sub-field(s) is used for determining a slot format.

In one embodiment, any of the K first-type time units is a slot.

In one embodiment, any of the K1 first-type time unit(s) comprises multicarrier symbols of a type other than the first type.

In one embodiment, any of the K1 type indicator set(s) comprises M type indicators, the M is a fixed positive integer.

In one subembodiment of the above embodiment, the M is equal to 14.

In one subembodiment of the above embodiment, the M type indicators are respectively used for indicating types of corresponding M multicarrier symbols.

In one embodiment, a given second sub-field is any one of the K1 second sub-field(s), the given second sub-field is used for indicating a type of multicarrier symbols comprised by a given first-type time unit of the K1 first-type time unit(s).

In one subembodiment of the above embodiment, the given second sub-field comprises M type indicators, respectively corresponding to marks J_1 to J_M in FIG. 10; the given first-type time unit comprises M multicarrier symbols, corresponding to multicarrier symbols L_1 to L_M in FIG. 10; the M type indicators are respectively used for indicating types of the M multicarrier symbols.

In one subsidiary embodiment of the above subembodiment, any one of type indicators from J_1 to J_M is used for indicating that the type of corresponding multicarrier symbols is one of "D", "U" and "X".

In one embodiment, a number of bits comprised in the second field is variable.

In one embodiment, a number of bits comprised in the second field is configured by a higher layer signaling.

In one embodiment, a number of bits comprised in the second field is related to the K1 value.

Embodiment 11

Figure 11:
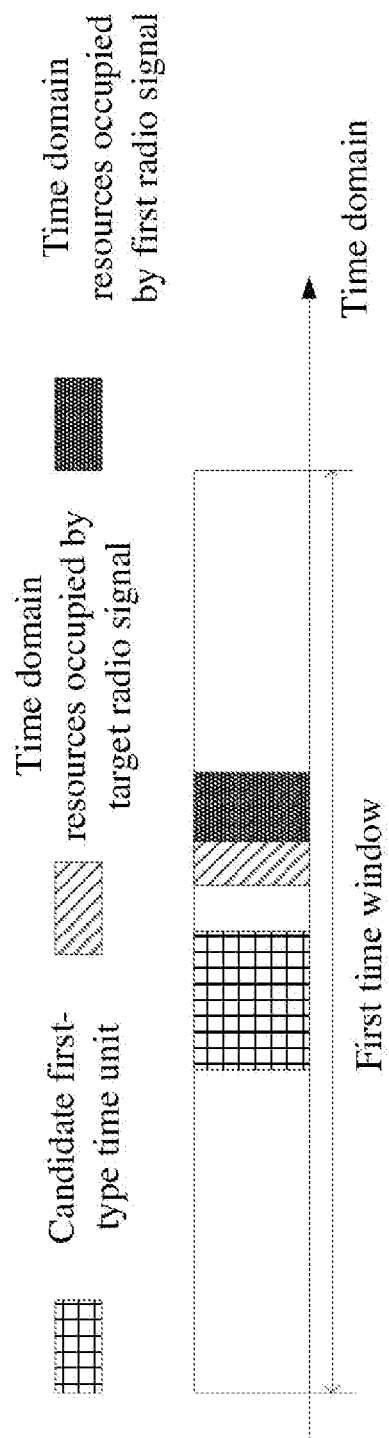
FIG. 11 illustrates a schematic diagram of a target radio signal according to one embodiment of the present disclosure.

Embodiment 11 illustrates a schematic diagram of a target radio signal, as shown in FIG. 11. In FIG. 11, the first time window in the present disclosure comprises time domain resources occupied by the target radio signal; time domain resources occupied by the first radio signal are located after time domain resources occupied by the target radio signal, and the time domain resources occupied by the first radio signal and the time domain resources occupied by the target radio signal are consecutive in time domain; the time domain resources occupied by the target radio signal are located after a candidate first-type time unit shown in FIG. 11.

In one embodiment, time domain resources occupied by the target radio signal is no greater than time duration of 4 multicarrier symbols.

In one embodiment, the target radio signal includes a Discovery Reference Signal (DRS).

In one embodiment, the target radio signal includes a Synchronization Signal Block (SSB).

Embodiment 12

Figure 12:
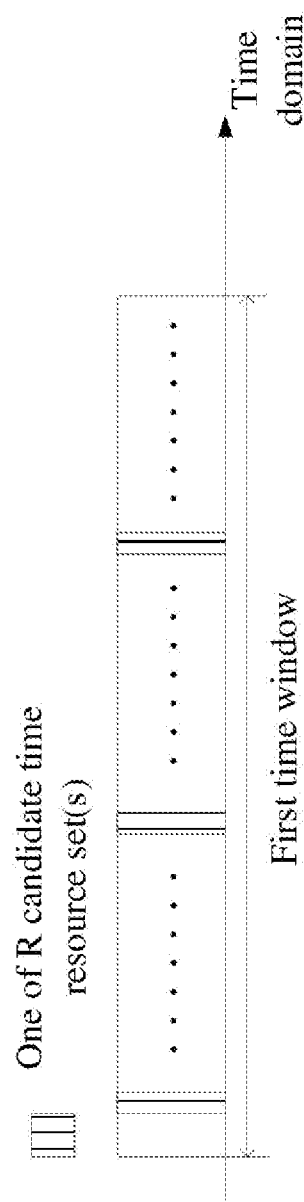
FIG. 12 illustrates a schematic diagram of R candidate time resource set(s) according to one embodiment of the present disclosure.

Embodiment 12 illustrates a schematic diagram of R candidate time resource set(s), as shown in FIG. 12. In FIG. 12, the first time window in the present disclosure comprises time domain resources occupied by the R candidate time resource set(s), the target radio signal in the present disclosure is transmitted in one of the R candidate time resource set(s); R is a positive integer.

In one embodiment, any of the R candidate time resource set(s) comprises a positive integer number of multicarrier symbol(s) in time domain.

In one embodiment, any of the R candidate time resource set(s) comprises consecutive time domain resources.

In one embodiment, the R candidate time resource set(s) is(are) configured by a higher signaling.

In one embodiment, time domain resources occupied by the R candidate time resource set(s) are pre-defined.

In one embodiment, time domain resources occupied by the R candidate time resource set(s) are fixed.

In one embodiment, the R candidate time resource set(s) occurs (occur) periodically in time domain.

In one embodiment, a first multicarrier symbol is an earliest multicarrier symbol to be indicated as the second type multicarrier symbol of the present disclosure in time domain within the first time window; for the first node in the present disclosure, the first node performs coherent detection on a characteristic sequence in R1 out of the R candidate time resource set(s) located after the first multicarrier symbol; R1 is a positive integer not greater than R.

In one subembodiment, the target radio signal is detected in one of the R1 candidate time resource set(s); the first node receives the first radio signal in the represent disclosure.

In one embodiment, a first multicarrier symbol is an earliest multicarrier symbol to be indicated as the second type multicarrier symbol of the present disclosure in time domain within the first time window; R1 candidate time resource set(s) is(are) candidate time resource set(s) located after the first multicarrier symbol out of the R candidate time resource set(s); the second node in the present disclosure transmits a target radio signal in one of the R1 candidate time resource set(s), and the second node transmits the first radio signal; R1 is a positive integer not greater than R.

In one embodiment, a first multicarrier symbol is an earliest multicarrier symbol to be indicated as the second type multicarrier symbol of the present disclosure in time domain within the first time window; for the first node in the present disclosure, the first node does not perform coherent detection on the characteristic sequence in R2 out of the R candidate time resource set(s) located before the first multicarrier symbol, and the first node directly performs blind detection on the first radio signal; R2 is a positive integer not greater than R.

In one embodiment, a first multicarrier symbol is an earliest multicarrier symbol to be indicated as the second type multicarrier symbol of the present disclosure in time domain within the first time window; for the second node in the present disclosure, the second node does not transmit the target radio signal in R2 out of the R candidate time resource set(s) located before the first multicarrier symbol, and the second node directly transmits the first radio signal; R2 is a positive integer not greater than R.

In one embodiment, a first multicarrier symbol is an earliest multicarrier symbol to be indicated as the third type multicarrier symbol of the present disclosure in time domain within the first time window; R1 candidate time resource set(s) is(are) candidate time resource set(s) located after the first multicarrier symbol out of the R candidate time resource set(s); the second node in the present disclosure transmits a target radio signal in one of the R1 candidate time resource set(s), and the second node transmits the first radio signal; R1 is a positive integer not greater than R.

In one embodiment, a first multicarrier symbol is an earliest multicarrier symbol to be indicated as the third type multicarrier symbol of the present disclosure in time domain within the first time window; for the first node in the present disclosure, the first node does not perform coherent detection on the characteristic sequence in R2 out of the R candidate time resource set(s) located before the first multicarrier symbol, and the first node directly performs blind detection on the first radio signal; R2 is a positive integer not greater than R.

In one embodiment, a first multicarrier symbol is an earliest multicarrier symbol to be indicated as the third type multicarrier symbol of the present disclosure in time domain within the first time window; for the second node in the present disclosure, the second node does not transmit the target radio signal in R2 out of the R candidate time resource set(s) located before the first multicarrier symbol, and the second node directly transmits the first radio signal; R2 is a positive integer not greater than R.

Embodiment 13

Figure 13:
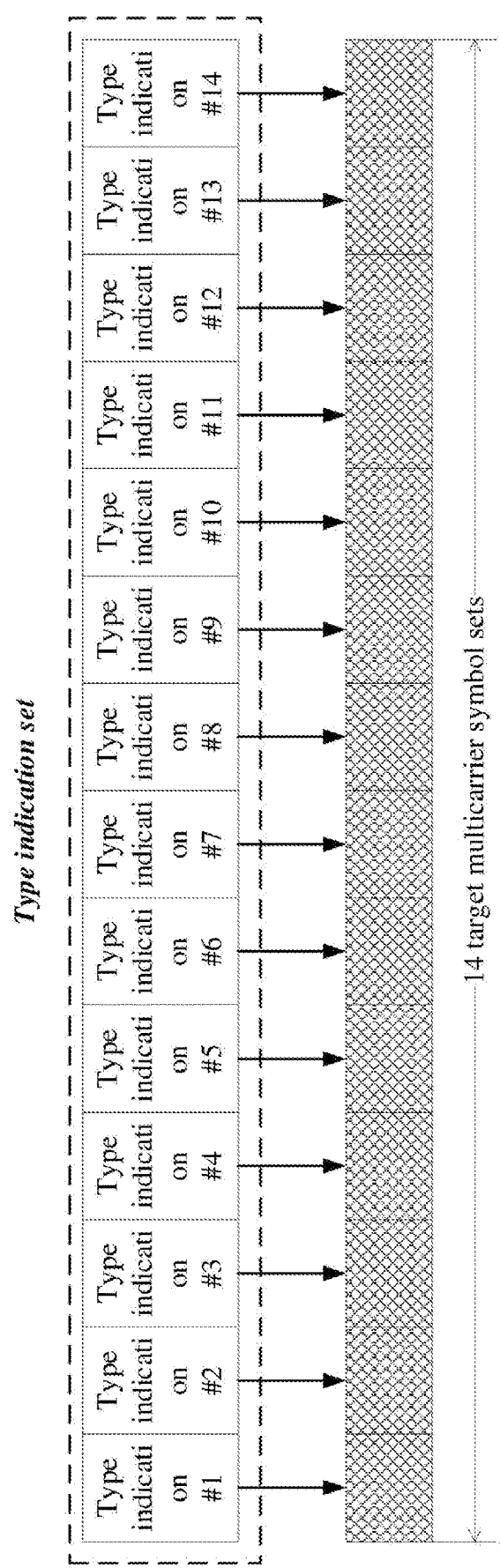
FIG. 13 illustrates a schematic diagram of a type indicator set according to one embodiment of the present disclosure.

Embodiment 13 illustrates a schematic diagram of a type indicator set, as shown in FIG. 13. In FIG. 13, the type indicator set comprises 14 type indicators, respectively corresponding to type indicators from type indicator #1 to type indicator #14 in FIG. 13; the 14 type indicators correspond to types of multicarrier symbols comprised by 14 target multicarrier sets respectively.

In one embodiment, the first type in the present disclosure corresponds to the mark "D" in Table 1, the second type in the present disclosure corresponds to the mark "U" in Table 1, and the third type in the present disclosure corresponds to the mark "X" in Table 1.

In one embodiment, any of the 14 target multicarrier sets only comprises 1 multicarrier symbol.

In one embodiment, any of the 14 target multicarrier sets comprises a plurality of multicarrier symbols.

In one embodiment, multicarrier symbols comprised by any of the 14 target multicarrier sets employ a same type.

In one embodiment, the type indicator set corresponds to a DUX group in a row indicated by any one format from format 0 to format 55 in TS 38.213 Table 11.1.1-1.

In one embodiment, the type indicator set is one of 56 DUX groups illustrated by Table 1 of the present disclosure.

TABLE 1

| | | | | | | | | | | | | | | |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | F | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | F | F | U | U |
| 32 | D | D | D | D | D | D | D | D | D | F | F | F | U | U |
| 33 | D | D | D | D | D | D | D | D | F | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |

TABLE 1-continued

| 39 | D | D | D | F | F | U | U | U | U | U | U | U | U | U |
|---|---|---|---|---|---|---|---|---|---|---|---|---|---|---|
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | F | U | |
| 47 | D | D | F | U | U | U | D | D | D | F | U | U | U | |
| 48 | D | F | U | U | U | U | D | F | U | U | U | U | U | |
| 49 | D | D | D | D | F | F | U | D | D | D | D | F | F | U |
| 50 | D | D | F | F | U | U | U | D | D | F | U | U | U | |
| 51 | D | F | F | U | U | U | U | D | F | U | U | U | U | |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |

Embodiment 14

Figure 14:
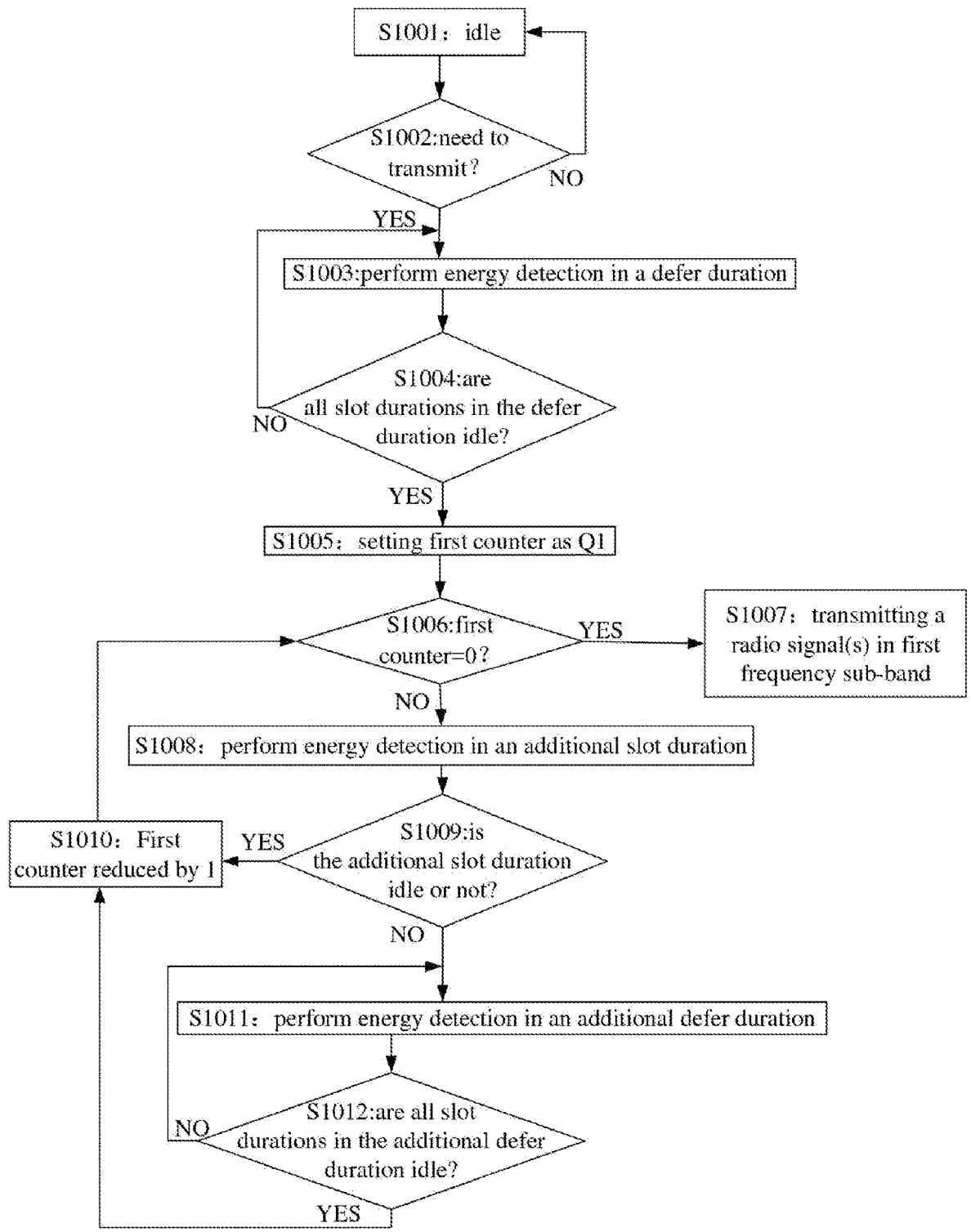
FIG. 14 illustrates a schematic diagram of channel detection according to one embodiment of the present disclosure.

Embodiment 14 illustrates a schematic diagram of channel detection, as shown in FIG. 14. In FIG. 14, the second node is idle in step S1001, determines whether there is need to transmit in step S1002; performs energy detection in a defer duration in step S1003; determines whether all slot durations within the defer duration are idle in step S1004; if yes, then move forward to step S1005 to set a first counter as Q1; otherwise go back to step S1004; determines whether the first counter is 0 in step S1006, if yes, move forward to step S1007 to transmit a radio signal in the first frequency sub-band in the present disclosure in step S1007; if not, move forward to step S1008 to perform energy detection in an additional slot duration in step S1008; determines whether the additional slot duration is idle in step S1009, if yes, move forward to step S1010 to reduce the first counter by 1, and go then back to step 1006; otherwise, move forward to step S1011 to perform energy detection in an additional defer duration in step S1011; determines whether all slot durations in the additional defer duration are idle, if yes, move forward to step S1010; otherwise go back to step S1011.

In one embodiment, the channel detection is a channel detection within the first frequency domain bandwidth in the present disclosure.

Embodiment 15

Figure 15:
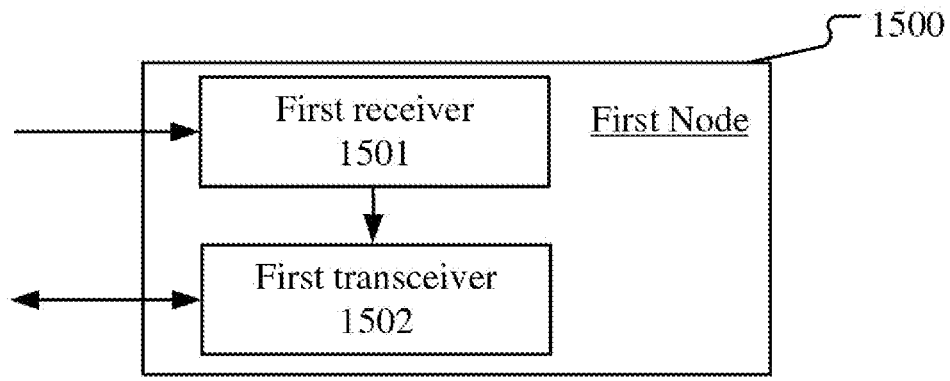
FIG. 15 illustrates a structure block diagram of a processing device in a first node according to one embodiment of the present disclosure.

Embodiment 15 illustrates a structure block diagram of a processing device in a first node, as shown in FIG. 15. In FIG. 15, a first node processing device 1500 comprises a first receiver 1501 and a first transceiver 1502.

The first receiver 1501 receives a first signaling.

The first transceiver 1502 operates a first radio signal.

In Embodiment 15, the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the operating is related to a type of multicarrier symbols occupied by the first radio signal; K is a positive integer greater than 1, K1 is a positive integer not greater than the K; the operating is receiving, or the operating is transmitting.

In one embodiment, the K1 is equal to the K, and the K first-type time units are the K1 first-type time units respectively; any of the K1 type indicator sets only comprises 1 type indicator; the second field comprises P information bits, the P information bits are used for determining K1 type indicators corresponding to the K1 type indicator sets; P is unrelated to the time duration of the first time window in time domain, a number of multicarrier symbols comprised by any of the K first-type time units is related to the time duration of the first time window in time domain; the P is a positive integer larger than 1.

In one embodiment, the K1 is no greater than the K; the second field also comprises a first sub-field, the first sub-field is used for determining the K1 first-type time unit(s) out of the K first-type time units; the K1 type indicator set(s) is(are) respectively used for indicating a type(s) of multicarrier symbols comprised by the K1 first-type time unit(s); any of the K first-type time units is a slot.

In one embodiment, the first transceiver 1502 also detects a target radio signal; a first sequence is used for generating the target radio signal, the first sequence is a characteristic sequence, and a detection on the target radio signal is a coherent detection; the operating is receiving and the first radio signal comprises a physical layer control signaling, the target radio signal is used for determining to receive the first radio signal; a candidate first-type time unit is an earliest first-type time unit of the K1 first-type time units in time domain; time domain resources occupied by the target radio signal belong to a target first-type time unit, the target first-type time unit is located after the candidate first-type time unit in time domain.

In one embodiment, the operating is receiving and the first signaling comprises a physical layer control signaling, a candidate first-type time unit is an earliest first-type time unit of the K1 first-type time units in time domain; the target first-type time unit is located before the candidate first-type time unit in time domain, or the target first-type time unit is the candidate first-type time unit, the first node does not perform coherent detection on a characteristic sequence before receiving the first radio signal.

In one embodiment, the first receiver 1501 comprises at least the first 4 of the antenna 452, the receiver 454, the multi-antenna receiving processor 458, the receiving processor 456 and the controller/processor 459 in Embodiment 4.

In one embodiment, the second transceiver 1502 comprises at least the first 6 of the antenna 452, the transmitter/receiver 454, the multi-antenna receiving processor 458, the multi-antenna transmitting processor 457, the receiving processor 456, the transmitting processor 468 and the controller/processor 459 in Embodiment 4.

Embodiment 16

Figure 16:
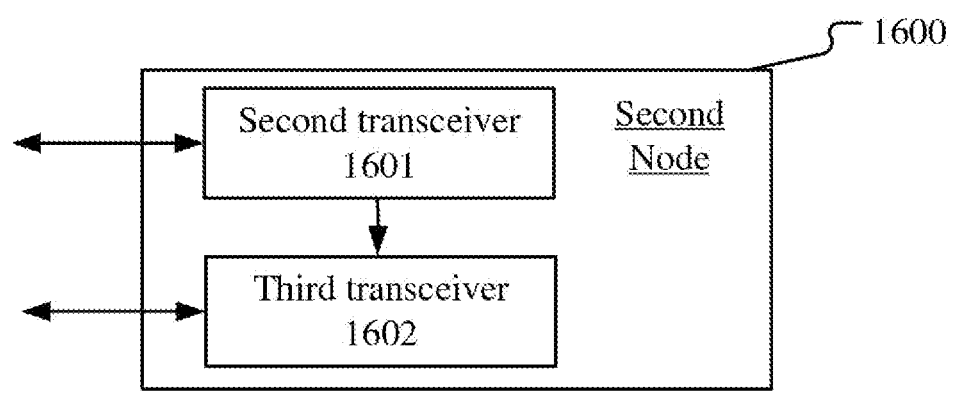
FIG. 16 illustrates a structure block diagram of a processing device in a second node according to one embodiment of the present disclosure.

Embodiment 16 illustrates a structure block diagram of a processing device in a second node, as shown in FIG. 16. In FIG. 16, a second node processing device 1600 comprises a second transceiver 1601 and a third transceiver 1602.

The second transceiver 1601 transmits a first signaling.

The third transceiver 1602 executes a first radio signal.

In Embodiment 16, the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the operating is related to a type of multicarrier symbols occupied by the first radio signal; K is a positive integer greater than 1, K1 is a positive integer not greater than the K; the executing is transmitting, or the executing is receiving.

In one embodiment, the K1 is equal to the K, and the K first-type time units are the K1 first-type time units respectively; any of the K1 type indicator sets only comprises 1 type indicator; the second field comprises P information bits, the P information bits are used for determining K1 type indicators corresponding to the K1 type indicator sets; P is unrelated to the time duration of the first time window in time domain, a number of multicarrier symbols comprised by any of the K first-type time units is related to the time duration of the first time window in time domain; the P is a positive integer larger than 1.

In one embodiment, the K1 is no greater than the K; the second field also comprises a first sub-field, the first sub-field is used for determining the K1 first-type time unit(s) out of the K first-type time units; the K1 type indicator set(s) is(are) respectively used for indicating a type(s) of multi-carrier symbols comprised by the K1 first-type time unit(s); any of the K first-type time units is a slot.

In one embodiment, the third transceiver 1602 also transmits a target radio signal; a first sequence is used for generating the target radio signal, the first sequence is a characteristic sequence, and a detection on the target radio signal is a coherent detection; the executing is transmitting and the first radio signal comprises a physical layer control signaling, the target radio signal is used for determining to receive the first radio signal; a candidate first-type time unit is an earliest first-type time unit of the K1 first-type time units in time domain; time domain resources occupied by the target radio signal belong to a target first-type time unit, the target first-type time unit is located after the candidate first-type time unit in time domain.

In one embodiment, the executing is transmitting and the first radio signal comprises a physical layer control signaling, a candidate first-type time unit is an earliest first-type time unit of the K1 first-type time units in time domain; the target first-type time unit is located before the candidate first-type time unit in time domain, or the target first-type time unit is the candidate first-type time unit, the second node does not transmit a characteristic sequence that triggers a monitoring on the first radio signal before transmitting the first radio signal.

In one embodiment, the second transceiver 1601 also performs channel detection within a first frequency domain bandwidth; frequency domain resources occupied by the first signaling belong to the first frequency domain bandwidth, the channel detection is used for determining that the first frequency domain bandwidth is idle.

In one embodiment, the second transceiver 1601 comprises at least the first 6 of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

In one embodiment, the third transceiver 1602 comprises at least the first 6 of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The second node in the present disclosure includes but is not limited to macro-cellular base stations, micro-cellular base stations, home base stations, relay base station, gNB (NR node B), Transmitter Receiver Point (TRP), vehicles, automobiles and other radio communication equipment used for V2X communication.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communication, comprising:

receiving a first signaling; and receiving a first radio signal or transmitting a first radio; wherein the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the first node receives the first radio signal when the type of multicarrier symbols occupied by the first radio signal is the first type or the third type, or the first node transmits the first radio signal when the type of multi-carrier symbols occupied by the first radio signal is the second type or the third type; K is a positive integer greater than 1, K1 is a positive integer not greater than the K;

the K1 is equal to the K, and the K first-type time units are the K1 first-type time units respectively, any of the K1 type indicator sets only comprises 1 type indicator, the second field comprises P information bits, the P information bits are used for determining K1 type indicators corresponding to the K1 type indicator sets, P is unrelated to the time duration of the first time window in time domain, a number of multicarrier symbols comprised by any of the K first-type time units is related to the time duration of the first time window in time domain, the P is a positive integer larger than 1; or the K1 is no greater than the K, the second field also comprises a first sub-field, the first sub-field is used for determining the K1 first-type time unit(s) out of the K first-type time units, the K1 type indicator set(s) is(are) respectively used for indicating a type(s) of multicarrier symbols comprised by the K1 first-type time unit(s), any of the K first-type time units is a slot.

2. The method according to claim 1, comprising:
detecting a target radio signal;
wherein a first sequence is used for generating the target radio signal, the first sequence is a characteristic sequence, and a detection on the target radio signal is a coherent detection; the first node receives the first radio signal and the first radio signal comprises a physical layer control signaling, the target radio signal is used for determining to receive the first radio signal; a candidate first-type time unit is an earliest first-type time unit of the K1 first-type time units in time domain; time domain resources occupied by the target radio signal belong to a target first-type time unit, the target first-type time unit is located after the candidate first-type time unit in time domain.

3. The method according to claim 1, wherein the first node receives the first radio signal and the first radio signal comprises a physical layer control signaling, a candidate first-type time unit is an earliest first-type time unit of the K1 first-type time units in time domain; the target first-type time unit is located before the candidate first-type time unit in time domain, or the target first-type time unit is the candidate first-type time unit, the first node does not perform coherent detection on a characteristic sequence before receiving the first radio signal.

4. A method in a second node for wireless communication, comprising:
transmitting a first signaling; and
transmitting a first radio signal or receiving a first radio signal;
wherein the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the second node transmits the first radio signal when the type of multicarrier symbols occupied by the first radio signal is the first type or the third type, or the second node receives the first radio signal when the type of multicarrier symbols occupied by the first radio signal is the second type or the third type; K is a positive integer greater than 1, K1 is a positive integer not greater than the K;
the K1 is equal to the K, and the K first-type time units are the K1 first-type time units respectively, any of the K1 type indicator sets only comprises 1 type indicator, the second field comprises P information bits, the P information bits are used for determining K1 type indicators corresponding to the K1 type indicator sets; P is unrelated to the time duration of the first time window in time domain, a number of multicarrier symbols comprised by any of the K first-type time units is related to the time duration of the first time window in time domain, the P is a positive integer larger than 1; or the K1 is no greater than the K, the second field also comprises a first sub-field, the first sub-field is used for determining the K1 first-type time unit(s) out of the K first-type time units, the K1 type indicator set(s) is(are) respectively used for indicating a type(s) of multicarrier symbols comprised by the K1 first-type time unit(s), any of the K first-type time units is a slot.

5. The method according to claim 4, comprising:
transmitting a target radio signal;
wherein a first sequence is used for generating the target radio signal, the first sequence is a characteristic sequence, and a detection on the target radio signal is a coherent detection; the second node transmits the first radio signal and the first radio signal comprises a physical layer control signaling, the target radio signal is used for determining to receive the first radio signal; a candidate first-type time unit is an earliest first-type time unit of the K1 first-type time units in time domain; time domain resources occupied by the target radio signal belong to a target first-type time unit, the target first-type time unit is located after the candidate first-type time unit in time domain.

6. The method according to claim 4, wherein the second node transmits the first radio signal and the first radio signal comprises a physical layer control signaling, a candidate first-type time unit is an earliest first-type time unit of the K1 first-type time units in time domain; the target first-type time unit is located before the candidate first-type time unit in time domain, or the target first-type time unit is the candidate first-type time unit, the second node does not transmit a characteristic sequence that triggers a monitoring on the first radio signal before transmitting the first radio signal.

7. A first node for wireless communication, comprising:
a first receiver, receiving a first signaling; and
a first transceiver, receiving a first radio signal or transmitting a radio signal;
wherein the first signaling is a physical layer signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the first node receives the first radio signal when the type of multicarrier symbols occupied by the first radio signal is the first type or the third type, or the first node transmits the first radio signal when the type of multicarrier symbols occupied by the first radio signal is the second type or the third type; K is a positive integer greater than 1, K1 is a positive integer not greater than the K;
the K1 is equal to the K, and the K first-type time units are the K1 first-type time units respectively, any of the K1 type indicator sets only comprises 1 type indicator, the second field comprises P information bits, the P information bits are used for determining K1 type indicators corresponding to the K1 type indicator sets, P is unrelated to the time duration of the first time window in time domain, a number of multicarrier symbols comprised by any of the K first-type time units is related to the time duration of the first time window in time domain, the P is a positive integer larger than 1, or the K1 is no greater than the K, the second field also comprises a first sub-field, the first sub-field is used for determining the K1 first-type time unit(s) out of the K first-type time units, the K1 type indicator set(s) is(are) respectively used for indicating a type(s) of multicarrier symbols comprised by the K1 first-type time unit(s), any of the K first-type time units is a slot.

8. The first node according to claim 7, wherein the first transceiver detects a target radio signal; a first sequence is used for generating the target radio signal, the first sequence is a characteristic sequence, a detection on the target radio signal is a coherent detection; the first node receives the first radio signal and the first radio signal comprises a physical layer control signaling, the target radio signal is used for determining to receive the first radio signal; a candidate first-type time unit is an earliest first-type time unit of the K1 first-type time units in time domain; time domain resources occupied by the target radio signal belong to a target first time-type time unit, the target first-type time unit is located after the candidate first-type time unit in time domain.

9. The first node according to claim 7, wherein the first node receives the first radio signal and the first radio signal comprises a physical layer control signaling, a candidate first-type time unit is an earliest first-type time unit of the K1 first-type time units in time domain; the target first-type time unit is located before the candidate first-type time unit in time domain, or the target first-type time unit is the candidate first-type time unit, the first node does not perform coherent detection on a characteristic sequence before receiving the first radio signal.

10. A second node for wireless communication, comprising:
 a second transceiver, transmitting a first signaling; and
 a third transceiver, transmitting a first radio signal or receiving a first radio signal;
 wherein the first signaling is a physical signaling, the first signaling comprises a first field and a second field; the first field indicates time duration of a first time window in time domain; the first time window comprises K first-type time units; a type of multicarrier symbols comprised by any of the K first-type time units is one of a first type, a second type and a third type; the K first-type time units include K1 first-type time unit(s); the second field is used for determining K1 type indicator set(s); the K1 type indicator set(s) is(are) respectively used for indicating a type(s) of multicarrier symbols comprised by the K1 first-type time unit(s); the second node transmits the first radio signal when the type of multicarrier symbols occupied by the first radio signal is the first type or the third type, or the second node receives the first radio signal when the type of multicarrier symbols occupied by the first radio signal is the second type or the third type; K is a positive integer greater than 1, K1 is a positive integer not greater than the K;

the K1 is equal to the K, and the K first-type time units are the K1 first-type time units respectively, any of the K1 type indicator sets only comprises 1 type indicator; the second field comprises P information bits, the P information bits are used for determining K1 type indicators corresponding to the K1 type indicator sets, P is unrelated to the time duration of the first time window in time domain, a number of multicarrier symbols comprised by any of the K first-type time units is related to the time duration of the first time window in time domain, the P is a positive integer larger than 1; or the K1 is no greater than the K, the second field also comprises a first sub-field, the first sub-field is used for determining the K1 first-type time unit(s) out of the K first-type time units, the K1 type indicator set(s) is(are) respectively used for indicating a type(s) of multicarrier symbols comprised by the K1 first-type time unit(s), any of the K first-type time units is a slot.

11. The second node according to claim 10, wherein the third transceiver transmits a target radio signal; a first sequence is used for generating the target radio signal, the first sequence is a characteristic sequence, and a detection on the target radio signal is a coherent detection; the second node transmits the first radio signal and the first radio signal comprises a physical layer control signaling, the target radio signal is used for determining to receive the first radio signal; a candidate first-type time unit is an earliest first-type time unit of the K1 first-type time units in time domain; time domain resources occupied by the target radio signal belong to a target first-type time unit, the target first-type time unit is located after the candidate first-type time unit in time domain.

12. The method according to claim 10, wherein the second node transmits the first radio signal and the first radio signal comprises a physical layer control signaling, a candidate first-type time unit is an earliest first-type time unit of the K1 first-type time units in time domain; the target first-type time unit is located before the candidate first-type time unit in time domain, or the target first-type time unit is the candidate first-type time unit, the second node does not transmit a characteristic sequence that triggers a monitoring on the first radio signal before transmitting the first radio signal.

* * * * *